US012667867B2

(12) United States Patent
Sumi

(10) Patent No.: US 12,667,867 B2
(45) Date of Patent: Jun. 30, 2026

(54) PROCESSING CHAMBER CLEANING METHOD, CLEANING ATTACHMENT AND SUBSTRATE PROCESSING SYSTEM

(71) Applicant: SCREEN Holdings Co., Ltd., Kyoto (JP)

(72) Inventor: Noritake Sumi, Kyoto (JP)

(73) Assignee: SCREEN HOLDINGS CO., LTD. (JP)

( * ) Notice: Subject to any disclaimer, the term of this patent is extended or adjusted under 35 U.S.C. 154(b) by 7 days.

(21) Appl. No.: 18/511,256

(22) Filed: Nov. 16, 2023

(65) Prior Publication Data

US 2024/0157410 A1 May 16, 2024

(30) Foreign Application Priority Data

Nov. 16, 2022 (JP) ................................. 2022-183327
Nov. 30, 2022 (JP) ................................. 2022-191850

(51) Int. Cl.
*B08B 7/00* (2006.01)
*B08B 9/08* (2006.01)

(52) U.S. Cl.
CPC .............. *B08B 7/0021* (2013.01); *B08B 9/08* (2013.01); *B08B 2209/08* (2013.01)

(58) Field of Classification Search
CPC ...... B08B 7/0021; B08B 9/08; B08B 2209/08
See application file for complete search history.

(56) References Cited

U.S. PATENT DOCUMENTS 12,159,784 B2 * 12/2024 Yamaguchi ....... H01L 21/67126
2008/0092806 A1 4/2008 West et al. ...................... 118/70
2018/0158699 A1 6/2018 Kitayama et al.
2019/0148182 A1 5/2019 Yamada et al.
2020/0365437 A1 11/2020 Kawahara et al.
2021/0013064 A1 1/2021 Yoon et al.
(Continued)

FOREIGN PATENT DOCUMENTS

CN 109786290 A 5/2019
CN 112216631 A 1/2021
(Continued)

OTHER PUBLICATIONS

Machine Translation of WO2021171810A1 (Year: 2021).*
(Continued)

*Primary Examiner* — Sharidan Carrillo
(74) *Attorney, Agent, or Firm* — OSTROLENK FABER LLP

(57) ABSTRACT

This invention relates a processing chamber cleaning method for a supercritical processing apparatus for accommodating a supporting member supporting a substrate into a processing space of a processing chamber and processing the substrate by a processing fluid in a supercritical state in the processing space. The processing chamber cleaning method includes supporting a flat dish-like container storing a cleaning liquid on the supporting member and accommodating the supporting member into the processing space, filling the processing space with the processing fluid in the supercritical state and discharging the processing fluid. It is capable of effectively cleaning the inside of even a supercritical processing chamber including a processing space having a narrow opening and a large depth.

4 Claims, 15 Drawing Sheets

(56) References Cited

U.S. PATENT DOCUMENTS

| | | | | |
|---|---|---|---|---|
| 2021/0082691 | A1 | 3/2021 | Fukui et al. | |
| 2021/0159095 | A1 | 5/2021 | Ihara et al. | |
| 2021/0242058 | A1 | 8/2021 | Sumi | |
| 2021/0313199 | A1 | 10/2021 | Sumi et al. | |
| 2023/0073624 | A1* | 3/2023 | Shimomura | H01L 21/02057 |
| 2023/0074202 | A1* | 3/2023 | Yamaguchi | H01L 21/67126 |
| 2023/0290632 | A1* | 9/2023 | Goshi | H01L 21/02057 |
| 2024/0157410 | A1* | 5/2024 | Sumi | B08B 7/0021 |

FOREIGN PATENT DOCUMENTS

| | | | |
|---|---|---|---|
| JP | H01-161834 | A | 6/1989 |
| JP | 2003-165138 | A | 6/2003 |
| JP | 2010-507252 | A | 3/2010 |
| JP | 2015-207661 | A | 11/2015 |
| JP | 2018-093063 | A | 6/2018 |
| JP | 2018-207076 | A | 12/2018 |
| JP | 2020-188228 | A | 11/2020 |
| JP | 2021-044457 | A | 3/2021 |
| JP | 2021-125472 | A | 8/2021 |
| JP | 2021-136373 | A | 9/2021 |
| JP | 2021-163916 | A | 10/2021 |
| TW | 202125678 | A | 7/2021 |
| WO | WO 2005/038868 | A2 | 4/2005 |

OTHER PUBLICATIONS

Office Action issued on Jan. 6, 2025 for corresponding Taiwanese Patent Application No. 112142756.

Notice of Allowance issued on Jul. 8, 2025 for corresponding Korean Patent Application No. 10-2023-0156131 with English translation.

Notice of Allowance dated Apr. 14, 2026 issued in corresponding Japanese Patent Application No. 2022-183327 and its English translation.

Office Action issued on May 12, 2026 for the corresponding Japanese Patent Application No. 2022-191850 and its English translation.

* cited by examiner

PROCESSING CHAMBER CLEANING METHOD, CLEANING ATTACHMENT AND SUBSTRATE PROCESSING SYSTEM

CROSS REFERENCE TO RELATED APPLICATION

The disclosure of Japanese Patent Applications enumerated below including specifications, drawings and claims is incorporated herein by reference in its entirety:

No. 2022-183327 filed on Nov. 16, 2022; and

No. 2022-191850 filed on Nov. 30, 2022.

BACKGROUND OF THE INVENTION

1. Field of the Invention

This invention relates to a technique for cleaning the inside of a processing chamber of a supercritical apparatus for accommodating a substrate in a processing space inside and performing a supercritical processing.

2. Description of the Related Art

A processing process of various substrates such as semiconductor substrates and glass substrates for display device includes a processing of substrate surfaces by various processing fluids. A processing using a liquid such as a chemical solution or a rinse liquid as a processing fluid has been conventionally widely performed. In recent years, a processing using a supercritical fluid also has been put to practical use. Particularly, in a processing of a substrate having a fine pattern formed on a surface, a supercritical fluid having a lower surface tension than liquids reaches deep into gaps of the pattern. Thus, the processing can be efficiently performed. Further, an occurrence risk of pattern collapse due to a surface tension during drying can be reduced.

For example, JP 2021-163916A (patent literature 1) previously disclosed by the applicant of this application describes a substrate processing apparatus for drying a substrate using a supercritical fluid. In this substrate processing apparatus, a substrate to be processed is accommodated into a supercritical processing chamber while being placed on a flat plate-like tray. The supercritical processing chamber configured by combining a plurality of metal blocks includes a slit-like opening extending in a horizontal direction in a side surface and is formed with a processing space communicating with this opening to accommodate the tray inside. To reduce the use amount of the processing fluid, a size of the processing space is suppressed to be slightly larger than an external size of the tray. That is, the processing space viewed from the opening is a space narrow in an up-down direction, long in a horizontal direction and having a large depth.

It is unavoidable that contaminants adhere in the processing chamber as the processing is repeated. Accordingly, the inside of the processing chamber needs to be regularly cleaned. However, as described above, the processing space in the conventional technique is a deep space having a slit-like opening, and cleaning by, for example, an operator's hand is not easy. Since the processing chamber of the above conventional technique is composed of the plurality of blocks, it is supposed to be possible to disassemble the processing chamber and clean the inside.

However, each block configured to withstand a high pressure has a large weight and cannot be said to be suitable for cleaning performed at a high frequency. Thus, a technique enabling efficient cleaning at a high frequency is required also for a processing chamber including a processing space having a narrow opening and having a large depth as described above, but such a technique has not been established yet thus far.

SUMMARY OF INVENTION

This invention was developed in view of the above problem and aims to provide a technique capable of effectively cleaning the inside of even a supercritical processing chamber including a processing space having a narrow opening and a large depth.

One aspect of this invention is directed to a processing chamber cleaning method for a supercritical processing apparatus for accommodating a supporting member supporting a substrate into a processing space of a processing chamber and processing the substrate by a processing fluid in a supercritical state in the processing space. This aspect includes supporting a flat dish-like container storing a cleaning liquid on the supporting member and accommodating the supporting member into the processing space, filling the processing space with the processing fluid in the supercritical state, and discharging the processing fluid.

Further, another aspect of this invention is directed to a processing chamber cleaning method in a supercritical processing apparatus with a wet processing apparatus for processing a substrate by supplying a processing liquid to the substrate, a supercritical processing apparatus for accommodating a supporting member supporting the substrate into a processing space of a processing chamber and processing the substrate by a processing fluid in a supercritical state in the processing space, and a conveyor device for conveying the substrate from the wet processing apparatus to the supercritical processing apparatus. This aspect includes storing a cleaning liquid in a flat dish-like container by the wet processing apparatus, conveying the container by the conveyor device and supporting the container by the supporting member and accommodating the supporting member, filling the processing space with the processing fluid in the supercritical state and then discharging the processing fluid into the processing space by the supercritical processing apparatus.

Further, still another aspect of this invention is directed to a substrate processing system with a wet processing apparatus which processes a substrate by supplying a processing liquid to the substrate, a supercritical processing apparatus which accommodates a supporting member supporting the substrate into a processing space of a processing chamber and processing the substrate by a processing fluid in a supercritical state in the processing space, a conveyor device which conveys the substrate from the wet processing apparatus to the supercritical processing apparatus, and a controller which controls the wet processing apparatus, the supercritical processing apparatus and the conveyor device to perform a cleaning processing for cleaning inside of the processing chamber. Here, the cleaning processing is performed by the wet processing apparatus storing a cleaning liquid in a flat dish-like container, the conveyor device conveying the container, the supporting member supporting the container thereon, and the supercritical processing apparatus accommodating the supporting member, filling the processing space with the processing fluid in the supercritical state and then discharging the processing fluid into the processing space.

In the invention configured as just described, the cleaning liquid spreads in the entire processing space under a high pressure by the processing fluid in the supercritical state filling the processing space. In this way, the inside of the processing chamber, more specifically, a wall surface forming the processing space, can be effectively cleaned. The cleaning liquid is stored in the container, and the supporting member originally for supporting the substrate is accommodated into the processing chamber with the substrate replaced by the container. In this way, the cleaning liquid is brought into the processing space together with the container.

Accordingly, a pipe and the like for introducing the cleaning liquid need not be connected to the processing chamber and a composition of the cleaning liquid can be arbitrarily set. Thus, the existing processing chamber can be used as it is and a liquid having an appropriate composition corresponding to its purpose and stain-causing substances can be used as the cleaning liquid, whereby an excellent cleaning effect can be obtained.

Further, still another aspect of this invention is directed to a cleaning attachment for a supercritical processing chamber for accommodating and discharging a substrate into and from a processing space formed in a chamber body by supporting the substrate and moving back and forth with respect to the processing space by a substrate supporting member. This cleaning attachment is provided with an engager to be detachably engaged with the substrate supporting member, a cleaner for coming into contact with a wall surface surrounding the processing space, out of the chamber body, and a connector for connecting the engager and the cleaner.

In the invention thus configured, the inside of the supercritical processing chamber can be cleaned, using back and forth movements of the substrate supporting member with respect to the chamber body. That is, when the supporting member moves back and forth with respect to the chamber body with the cleaning attachment attached thereto, the cleaner wipes the wall surface of the processing space by moving in contact with the wall surface. As just described, the cleaning attachment according to the invention can effectively clean the inside of the supercritical processing chamber by wiping the wall surface, using back and forth movements of the substrate supporting member.

As described above, according to the invention, the inside of the processing chamber can be effectively cleaned by spreading the cleaning liquid stored in the container and brought into the processing space in the entire processing space by the processing fluid in the supercritical state. Further, the cleaning attachment attached to the supporting member can effectively clean the inside of the supercritical processing chamber by wiping the wall surface, using back and forth movements of the supporting member, even if the supercritical processing chamber has a processing space having a narrow opening and a large depth.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
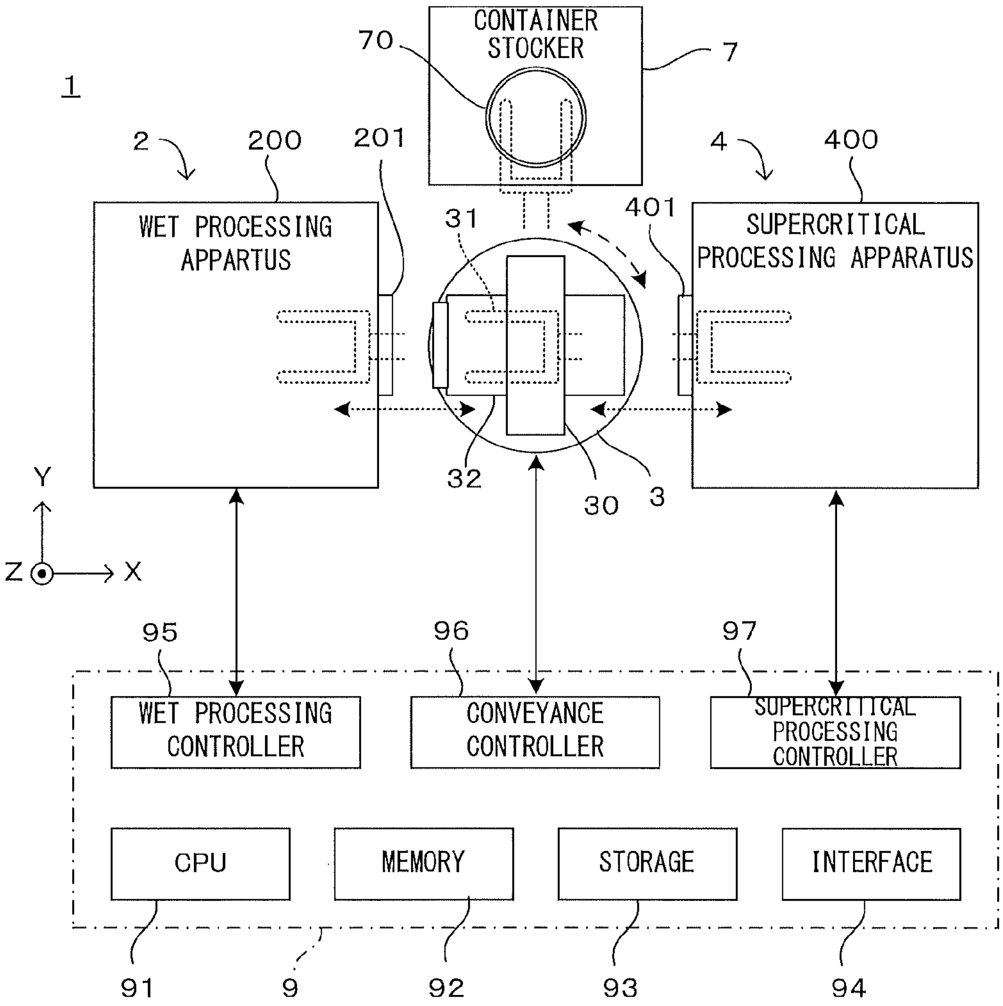
FIG. 1 is a drawing showing a schematic configuration of a substrate processing system to which the invention can be applied.

FIG. 1 is a drawing showing a schematic configuration of a substrate processing system to which the invention can be applied. XYZ orthogonal coordinate axes are set as shown in FIG. 1 to show directions in each figure in a unified manner below. Here, an XY plane represents a horizontal plane. Further, a Z axis represents a vertical axis, more particularly, a (−Z) direction represents a vertically downward direction.

This substrate processing system 1 is a processing system for wet-processing various substrates such as semiconductor wafers by supplying a processing fluid to the upper surfaces of the substrates and, thereafter, drying the substrates. The substrate processing system 1 has a suitable system configuration to carry out a substrate processing method according to the invention. That is, the substrate processing system 1 is provided with a wet processing apparatus 2, a conveyor device 3, a supercritical processing apparatus 4, a container stocker 7 and a controller 9 as main constitution.

The wet-processing apparatus 2, the conveyor device 3 and the supercritical processing apparatus 4 are arranged in this order along a (+X) direction. Main components of the wet processing apparatus 2 are accommodated inside a processing chamber 200. An opening (not shown), through which the substrate is carried in and out, is provided in a side surface on a (+X) side of the processing chamber 200, and an openable and closable shutter 201 is provided for this opening. On the other hand, main components of the supercritical processing apparatus 4 are accommodated inside a processing chamber 400. An opening (not shown), through which the substrate is carried in and out, is provided in a side surface on a (−X) side of the processing chamber 400, and an openable and closable shutter 401 is provided for this opening.

The wet processing apparatus 2 receives a substrate to be processed and performs a predetermined wet processing. Contents of the processing are not particularly limited. The conveyor device 3 carries out the substrate after the wet processing from the wet processing apparatus 2, conveys and carries the substrate into the supercritical processing apparatus 4. The supercritical processing apparatus 4 performs a drying processing (supercritical drying processing) using a processing fluid in a supercritical state for the substrate carried thereinto. These are installed in a clean room. Therefore, the conveyor device 3 conveys the substrate S in a clean atmosphere and under an atmospheric pressure.

The container stocker 7 has a function of storing a cleaning liquid container 70 which is used for cleaning a processing chamber of the supercritical cleaning apparatus 4. A cleaning processing of the processing chamber using the cleaning liquid container 70 is described later.

The control unit 9 realizes a predetermined process by controlling these components of the apparatus. For this purpose, the control unit 9 includes a CPU 91, a memory 92, a storage 93, an interface 94, and the like. The CPU 91 executes various control programs. The memory 92 temporarily stores processing data. The storage 93 stores the control programs to be executed by the CPU 91. The interface 94 performs information exchange with a user and an external apparatus. Operations of the apparatus to be described later are realized by the CPU 91 causing each component of the apparatus to perform a predetermined operation by executing the control program written in the storage 93 in advance.

The CPU 91 executes a predetermined control program, whereby functional blocks such as a wet processing controller 95 for controlling the operation of the wet processing apparatus 2, a conveyance controller 96 for controlling the operation of the conveyor device 3 and a supercritical processing controller 97 for controlling the operation of the supercritical processing apparatus 4 are realized by software in the controller 9. Note that each of these functional blocks may be at least partially configured by dedicated hardware.

Here, various substrates such as semiconductor wafers, glass substrates for photomask, glass substrates for liquid crystal display, glass substrates for plasma display, substrates for FED (Field Emission Display), optical disk substrates, magnetic disk substrates and magneto-optical disk substrates can be applied as the "substrate" in this embodiment. The substrate processing apparatus used in processing semiconductor wafers is mainly described as an example with reference to the drawings below. However, application to the processing of various substrates illustrated above is also possible. Further, various shape of the substrate are also available.

Figure 2:
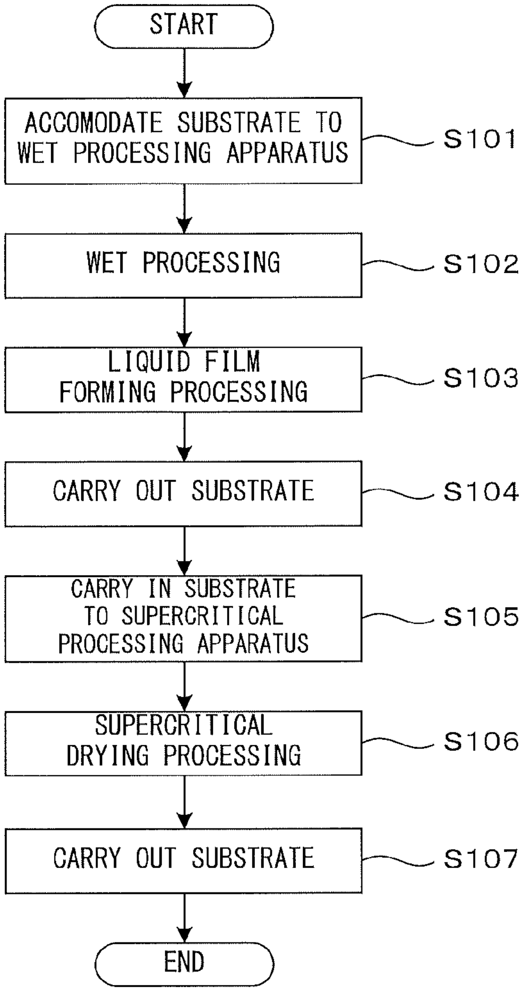
FIG. 2 is a flow chart summarizing a process performed by this substrate processing system.

FIG. 2 is a flow chart summarizing a process performed by this substrate processing system. This substrate processing system 1 receives a substrate S (FIGS. 2, 3) to be processed and sequentially performs the wet processing using a processing liquid and the supercritical drying processing using a supercritical processing fluid. Specifically, the process is performed as follows. The substrate S to be processed is accommodated into the wet processing apparatus 2 constituting the substrate processing system 1 (Step S101). The substrate S may be directly carried in by an external conveyor device or may be carried in via the conveyor device 3 from an external conveyor.

The wet processing apparatus 2 applies the wet processing to the substrate S using the predetermined processing liquid (Step S102). Thereafter, a liquid film formation processing of forming a liquid film on a surface by an organic solvent such as IPA (isopropyl alcohol) is performed (Step S103). For example, if a fine pattern is formed on the surface of the substrate S, the pattern may collapse due to a surface tension of the liquid remaining on and adhering to the substrate S. Further, watermarks may remain on the surface of the substrate S due to incomplete drying. Further, the surface of the substrate S may undergo deterioration such as oxidation due to contact with outside air. To avoid such problems, the substrate S may be conveyed with the surface (pattern forming surface) thereof covered with a liquid.

For example, if a cleaning liquid mainly contains water, the substrate is conveyed in a state where a liquid film is formed by a liquid having a lower surface tension than water and having low corrosiveness to the substrate, e.g. an organic solvent such as IPA or acetone. That is, the substrate S is carried out from the wet processing apparatus 2 by the conveyor device 3 while being horizontally supported and having a liquid film formed on the upper surface thereof (Step S104), further conveyed and finally carried into the supercritical processing apparatus 4 (Step S105).

The supercritical processing apparatus 4 applies the supercritical drying processing to the substrate S conveyed thereto (Step S106). The processing fluid in the supercritical state has a very low surface tension and a low fluidity. Thus, the processing fluid enters the fine pattern formed on the surface of the substrate S and replaces the liquid in the pattern. For example, in the case of using carbon dioxide as the supercritical processing fluid, the liquid forming the liquid film can be efficiently replaced and removed from the substrate surface since carbon dioxide dissolves into the organic solvent well.

The supercritical processing fluid is vaporized without via a liquid phase, and discharged. The liquid adhering to the substrate S is replaced by the supercritical processing fluid and discharged, and the processing fluid is also discharged, whereby the substrate S in a dry state is obtained. Since a gas-liquid interface is not formed in this process, the pattern collapse due to a surface tension can be avoided. The substrate S after the processing is carried out from the supercritical processing apparatus 4 by the conveyor device 3 and transferred to the following process (Step S107). Contents of the following process are arbitrary.

The structure of each constituent element of the substrate processing system 1 for performing the series of processings described above is described more specifically.

A center robot 30 provided with a hand 31 on the tip of an unillustrated telescopic and rotatable arm is provided in the conveyor device 3. As shown by broken line arrows, the center robot 30 is rotatable about a Z axis. The hand 31 can support the substrate by partially contacting the lower surface of the substrate. As shown by dotted lines in FIG. 1, the hand 31 is stored inside a cover 32 and movable back and forth to each of the wet processing apparatus 2, the supercritical processing apparatus 4 and the container stocker 7 by advancing to outside from the cover 32 if necessary. In this way, the substrate can be carried into and out from each of the wet processing apparatus 2 and the supercritical processing apparatus 4. The operation of the center robot 30 is controlled by the conveyance controller 96 of the controller 9.

Further, the center robot 30 accesses the container stocker 7 in response to a control command from the conveyance controller 96, carries out the cleaning liquid container 70 from the container stocker 7 and carries the cleaning liquid container 70 into the container stocker 7.

A center robot described in JP 2020-188228A previously disclosed by the applicant of this application is suitably applicable as the conveyor robot of this type. Since this publication can be referred to, the specific structure of the center robot 30 is not described here.

Figure 3:
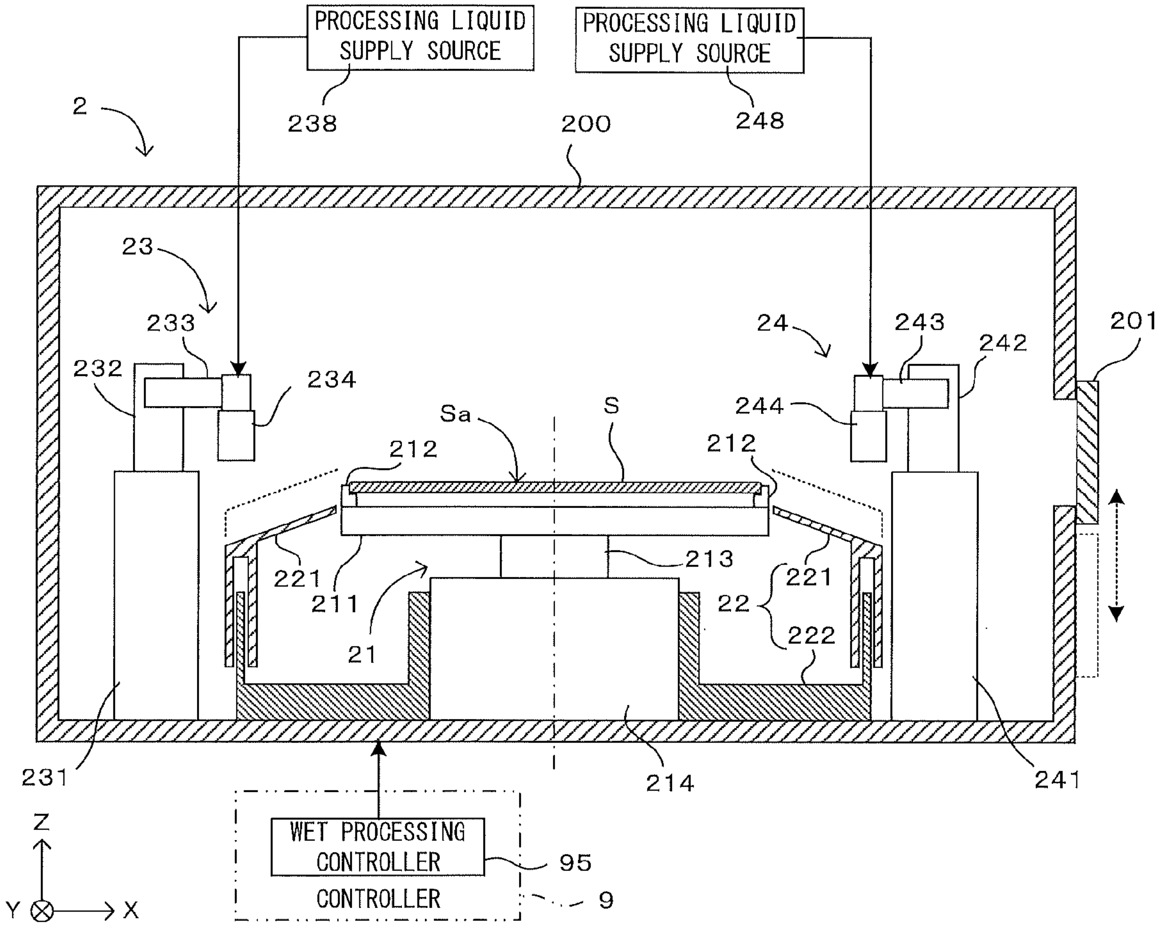
FIG. 3 is a diagram showing a configuration example of the wet processing apparatus.

FIG. 3 is a diagram showing a configuration example of the wet processing apparatus. More specifically, FIG. 3 is a side view showing the overall configuration of the wet processing apparatus 2. This wet processing apparatus 2 is an apparatus for processing a substrate by supplying the processing liquid to the upper surface of the substrate. The operation of the wet processing apparatus 2 is controlled by the wet processing controller 95 of the controller 9.

The wet processing apparatus 2 performs a surface processing of the substrate S and a wet processing such as washing by supplying the processing liquid to the upper surface Sa of the substrate S. For this purpose, the wet processing apparatus 2 is provided with a substrate holder 21, a splash guard 22 and processing liquid suppliers 23, 24 inside the processing chamber 200. The operations of these are controlled by the wet processing controller 95 provided in the controller 9.

The substrate holder 21 includes a disk-like spin chuck 211 having a diameter nearly equal to that of the substrate S, and a plurality of chuck pins 212 are provided on a peripheral edge part of the substrate S. The chuck pins 212 are in contact with the peripheral edge part of the substrate S to support the substrate S, whereby the spin chuck 211 can hold the substrate S in a horizontal posture with the substrate S separated from the upper surface of the spin chuck 211.

The spin chuck 211 is so supported that the upper surface thereof is horizontal by a rotary support shaft 213 extending downward from a central part of the lower surface of the spin chuck 211. The rotary support shaft 213 is rotatably supported by a rotating mechanism 214 mounted in a bottom part of the processing chamber 200. The rotating mechanism 214 includes an unillustrated built-in rotary motor. The rotary motor rotates in response to a control command from the controller 9, whereby the spin chuck 211 directly coupled to the rotary support shaft 213 rotates about a vertical axis indicated by a dashed-dotted line. In FIG. 3 an up-down direction is a vertical direction. In this way, the substrate S is rotated about the vertical axis while being held in the horizontal posture.

The splash guard 22 is provided to laterally surround the substrate holder 21. The splash guard 22 includes a substantially tubular cup 221 provided to cover the peripheral edge part of the spin chuck 211 and a liquid receiver 222 provided below an outer peripheral part of the cup 221. The cup 211 is raised and lowered in response to a control command from the controller 9. The cup 221 is raised and lowered between a lower position where an upper end part of the cup 221 is lowered to below the peripheral edge part of the substrate S held by the spin chuck 211 as shown by solid lines in FIG. 3 and an upper position where the upper end part of the cup 221 is located above the peripheral edge part of the substrate S as shown by dotted lines in FIG. 3.

As shown by solid lines in FIG. 3, when the cup 221 is at the lower position, the substrate S held by the spin chuck 211 is exposed to the outside of the cup 221. Thus, the cup 221 is, for example, prevented from becoming an obstacle when the substrate S is carried to and from the spin chuck 211.

Further, as indicated by dotted lines in FIG. 3, the cup 221 surrounds the peripheral edge part of the substrate S held by the spin chuck 211 when being at the upper position. In this way, the processing liquid shaken off from the peripheral edge part of the substrate S during liquid supply to be described later is prevented from scattering in the processing chamber 200, and the processing liquid can be reliably collected. That is, by the rotation of the substrate S, droplets of the processing liquid shaken off from the peripheral edge part of the substrate S adhere to the inner wall of the cup 221, flow down and are finally gathered and collected by the liquid receiver 222 arranged below the cup 221. To individually collect a plurality of processing liquids, cups may be concentrically provided at a plurality of levels.

The processing liquid supplier 23 is structured such that a nozzle 234 is attached to the tip of an arm 233 horizontally extending from a rotary support shaft 232 provided rotatably with respect to a base 231 fixed in the processing chamber 200. The rotary support shaft 232 rotates in response to a control command from the controller 9, whereby the arm pivots and the nozzle 234 on the tip of the arm 233 moves between a retreated position retracted laterally from above the substrate S and a processing position above the substrate S.

The nozzle 234 is connected to a processing liquid supply source 238. If an appropriate processing liquid is sent out from the processing liquid supply source 238, the processing liquid is discharged toward the substrate S from the nozzle 234. By supplying the processing liquid from the nozzle 234 positioned above a center of rotation of the substrate S while rotating the substrate S by the rotation of the spin chuck 211 at a relatively low speed, an upper surface Sa of the substrate S is processed by the processing liquid. Liquids having various functions such as developers, etching liquids, cleaning liquids and rinsing liquids can be used as the processing liquid, and a composition of the processing liquid is arbitrary. Further, the processing may be performed with a plurality of types of processing liquids combined.

Another processing liquid supplier 24 also has a configuration corresponding to the first processing liquid supplier 23 described above. That is, processing liquid supplier 24 includes a base 241, a rotary support shaft 242, an arm 243, a nozzle 244 and the like, and the configurations of these are the same as those of the corresponding components of the first processing liquid supplier 23. The rotary support shaft 242 rotates in response to a control command from the controller 9, whereby the arm 243 pivots. The nozzle 244 on the tip of the arm 243 supplies a processing liquid to the upper surface Sa of the substrate S.

In this wet processing apparatus 2, the second processing liquid supplier 24 is used for the purpose of forming a liquid film for dry prevention on the substrate S after the wet processing. That is, the substrate S after the wet processing is conveyed to the supercritical processing apparatus 4 and receives a supercritical drying processing. To prevent the surface of the substrate S from being exposed and oxidized during conveyance and prevent the collapse of the fine pattern formed on the surface, the substrate S is conveyed with the surface thereof covered with a puddle-like liquid film.

A substance having a lower surface tension than water, which is a main component of a processing liquid used in a cleaning processing, e.g. an organic solvent such as isopropyl alcohol (IPA) or acetone, is used as the liquid for constituting the liquid film.

Although two processing liquid suppliers are provided in the wet processing apparatus 2 here, the number, structures and functions of the processing liquid suppliers are not limited to these. For example, only one processing liquid supplier may be provided or three or more processing liquid suppliers may be provided. Further, one processing liquid supplier may include a plurality of nozzles. For example, a plurality of nozzles may be provided on the tip of one arm. Further, the processing liquid is not only discharged with the nozzle positioned at the predetermined position as described above, but also may be, for example, discharged while the nozzle is scanned and moved along the upper surface Sa of the substrate S. Further, a gas supplier including a nozzle for discharging a gas may be further provided. Further, at least one of a plurality of nozzles provided in the processing liquid supplier may discharge a gas.

Figure 4:
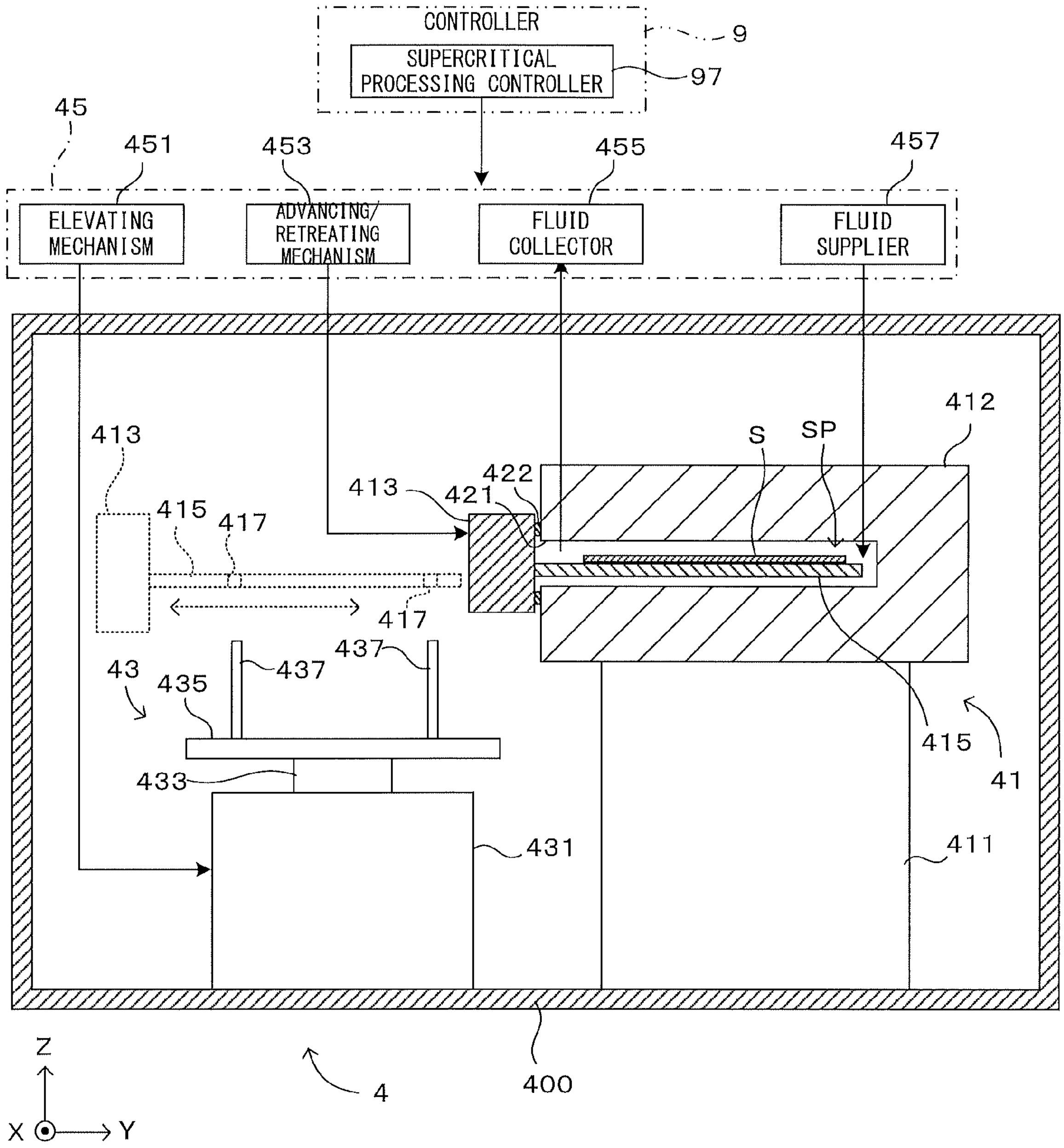
FIG. 4 is a side view showing the configuration of the supercritical processing apparatus.

FIG. 4 is a side view showing the configuration of the supercritical processing apparatus. The supercritical processing apparatus 4 is an apparatus for applying a drying processing using a processing fluid in a supercritical state to the substrate S after the wet processing. More specifically, the supercritical processing apparatus 4 is an apparatus for finally bringing the substrate S to a dry state by discharging the processing fluid after receiving the substrate S after the wet processing and replacing the liquid remaining on the substrate S by the processing fluid in the supercritical state.

The supercritical processing apparatus 4 is provided with a processing unit 41 and a transfer unit 43 provided in the processing chamber 400 and a supply unit 45. The processing unit 41 serves as an executor of the supercritical drying processing. The transfer unit 43 receives the substrate S after the wet processing conveyed by the conveyor device 3, carries the substrate S into the processing unit 41 and transfers the processed substrate S from the processing unit 41 to the conveyor device 3. The supply unit 45 supplies chemical substances, power, energy and the like necessary for the processing to the processing unit 41 and the transfer unit 43. These operations are controlled by the controller 9, particularly by the supercritical processing controller 97.

The processing unit 41 is structured such that a processing chamber 412 is mounted on a pedestal 411. The processing chamber 412 is configured by a combination of several metal blocks and the inside thereof is hollow and constitutes a processing space SP. The substrate S to be processed is carried into the processing space SP and processed. A slit-like opening 421 elongated in the X direction is formed in a side surface on the (−Y) side of the processing chamber 412. The processing space SP and an outside space communicate via the opening 421. A cross-sectional shape of the processing space SP is substantially the same as an opening shape of the opening 421. That is, the processing space SP is a hollow having a cross-sectional shape long in the X direction and short in the Z direction and extending in the Y direction.

A lid member 413 is provided to close the opening 421 on the side surface on the (−Y) side of the processing chamber 412. A flat plate-like support tray 415 is mounted in a horizontal posture on a side surface on the (+Y) side of the lid member 413. The upper surface of the support tray 415 serves as a support surface on which the substrate S can be placed. More specifically, as described later with reference to FIG. 5, the support tray 415 is structured such that a recess **415*b* formed to be slightly larger than a plane size of the substrate S is provided in a substantially flat upper surface 415*a*. By accommodating the substrate S into this recess 415*b*, the substrate S is held at a predetermined position on the support tray 415. The substrate S is held with a surface to be processed (hereinafter, may be merely referred to as a "substrate surface") Sa facing up. At this time, the upper surface 415*a* of the support tray 415** and the substrate surface Sa preferably constitute the same plane or substantially the same plane.

The lid member 413 is supported horizontally movably in the Y direction by an unillustrated supporting mechanism. Further, the lid member 413 is made movable back and forth with respect to the processing chamber 412 by an advancing/retreating mechanism 453 provided in the supply unit 45. Specifically, the advancing/retreating mechanism 453 includes a linear motion mechanism such as a linear motor, a linear motion guide, a ball screw mechanism, a solenoid or an air cylinder. Such a linear motion mechanism moves the lid member 413 in the Y direction. The advancing/retracting mechanism 453 operates in response to a control command from the controller 9.

If the lid member 413 is separated from the processing chamber 412 by moving in the (−Y) direction and the support tray 415 is pulled out from the processing space SP to outside via the opening 421 as indicated by a dotted line, the support tray 415 becomes accessible. That is, the substrate S can be placed on the support tray 415 and the substrate S placed on the support tray 415 can be taken out. On the other hand, by a movement of the lid member 413 in the (+Y) direction, the support tray 415 is accommodated into the processing space SP. If the substrate S is placed on the support tray 415, the substrate S is carried into the processing space SP together with the support tray 415.

If the lid member 413 moves in the (+Y) direction and closes the opening 421, the processing space SP is sealed. A sealing member 422 is provided between the side surface on the (+Y) side of the lid member 413 and the side surface on the (−Y) side of the processing chamber 412, and the processing space SP is held airtight. An annular sealing member made of an elastic resin material, e.g. rubber, can be used as the sealing member 422. Further, the lid member 413 is fixed to the processing chamber 412 by an unillustrated lock mechanism. As just described, the lid member 413 is switched between a closing state (solid line) where the lid member 413 closes the opening 421 to seal the processing space SP and a separated state (dotted line) where the lid member 413 is largely separated from the opening 421 to enable the substrate S to be taken in and out.

With the airtight state of the processing space SP ensured, the substrate S is processed in the processing space SP. In this embodiment, a fluid supplier 457 provided in the supply unit 45 sends out a processing fluid of a substance usable in the supercritical processing, e.g. carbon dioxide, as the processing fluid and further brings the processing fluid into a supercritical state by pressurizing the processing fluid in the processing chamber 412. The processing fluid is supplied in a gas or liquid state to the processing unit 41. Carbon dioxide is a chemical substance suitable for the supercritical drying processing in having a property of entering the supercritical state at relatively low temperature and low pressure and dissolving into an organic solvent often used in substrate processing well. At a critical point at which carbon dioxide enters the supercritical state, an atmospheric pressure (critical pressure) is 7.38 lVIPa and a temperature (critical temperature) is 31.1° C.

In the supercritical drying processing mainly for the purpose of drying the substrate while preventing pattern collapse due to a surface tension of the liquid, the substrate S is carried in with the surface Sa covered with a liquid film to prevent the exposure of the surface Sa and the occurrence of pattern collapse. An organic solvent having a relatively low surface tension such as isopropyl alcohol (IPA) or acetone can be suitably used as the liquid for constituting the liquid film.

If the processing fluid is filled into the processing space SP and the inside of the processing space SP reaches suitable temperature and pressure, the processing space SP is filled with the processing fluid in the supercritical state. In this way, the substrate S is processed by the supercritical fluid in the processing chamber 412. A fluid collector 455 is provided in the supply unit 45, and the fluid after the processing is collected by the fluid collector 455. The fluid supplier 457 and the fluid collector 455 are controlled by the supercritical processing controller 97.

The processing space SP has a shape and a volume capable of receiving the support tray 415 and the substrate S supported by the support tray 415. That is, the processing space SP has a substantially rectangular cross-sectional shape wider than a width of the support tray 415 in a horizontal direction and having a height larger than that of the support tray 415 in the vertical direction, and has a depth capable of receiving the support tray 415. As just described, the processing space SP has a shape and a volume enough to receive the support tray 415 and the substrate S. Gaps between the support tray 415 and the substrate S and the inner wall surface of the processing space SP are tiny. Therefore, the amount of the processing fluid necessary to fill the processing space SP can be relatively small.

The fluid supplier 457 supplies the processing fluid to the processing space SP on a side further in the (+Y) direction than the end part on the (+Y) side of the substrate S. On the other hand, the fluid collector 455 discharges the processing fluid flowing in a space above the substrate S and a space below the support tray 415, out of the processing space SP, on a side further in the (−Y) direction than the end part on the (−Y) side of the substrate S. In this way, laminar flows of the processing fluid from the (+Y) side toward the (−Y) side are respectively formed above the substrate S and below the support tray 415 in the processing space SP.

The supercritical processing controller 97 of the controller 9 specifies the pressure and temperature in the processing space SP based on a detection result of an unillustrated detector and controls the fluid supplier 457 and the fluid collector 455 based on that result. In this way, the supply of the processing fluid into the processing space SP and the discharge of the processing fluid from the processing space SP are properly managed and the pressure and temperature in the processing space SP are adjusted according to a processing recipe determined in advance.

The transfer unit 43 is in charge of the transfer of the substrate S between the conveyor device 3 and the support tray 415. For this purpose, the transfer unit 43 is provided with a body 431, an elevating member 433, a base member 435 and a plurality of lift pins 437. The elevating member 433 is a columnar member extending in the Z direction, and supported movably in the Z direction with respect to the body 431 by an unillustrated supporting mechanism. The base member 435 having a substantially horizontal upper surface is mounted atop the elevating member 433. The plurality of lift pins 437 stand up from the upper surface of the base member 435. The respective lift pins 437 support the substrate S in a horizontal posture from below by the contact of upper end parts thereof with the lower surface of the substrate S. Three or more lift pins 437 having the upper end parts at the same height are desirably provided to stably support the substrate S in the horizontal posture.

The elevating member 433 is made movable up and down by an elevating mechanism 451 provided in the supply unit 45. Specifically, the elevating mechanism 451 includes a linear motion mechanism such as a linear motor, a linear motion guide, a ball screw mechanism, a solenoid or an air cylinder, and such a linear motion mechanism moves the elevating member 433 in the Z direction. The elevating mechanism 451 operates in response to a control command from the controller 9.

The base member 435 is moved up and down by upward and downward movements of the elevating member 433, and the plurality of lift pins 437 move up and down integrally with the base member 435. In this way, the transfer of the substrate S is realized between the transfer unit 43 and the support tray 415. More specifically, as shown by dotted lines in FIG. 4, the substrate S is transferred with the support tray 415 pulled out to the outside of the chamber. For this purpose, the support tray 415 is provided with through holes 417, through which the lift pins 437 are inserted. If the base member 435 is raised, the upper ends of the lift pins 437 reach above the upper surface of the support tray 415 through the through holes 417. In this state, the substrate S conveyed by the center robot 30 is transferred from the hand 31 of the center robot 30 to the lift pins 437. By lowering the lift pins 437, the substrate S is transferred from the lift pins 437 to the support tray 415. The substrate S can be carried out by a procedure opposite to the above one.

Figure 5:
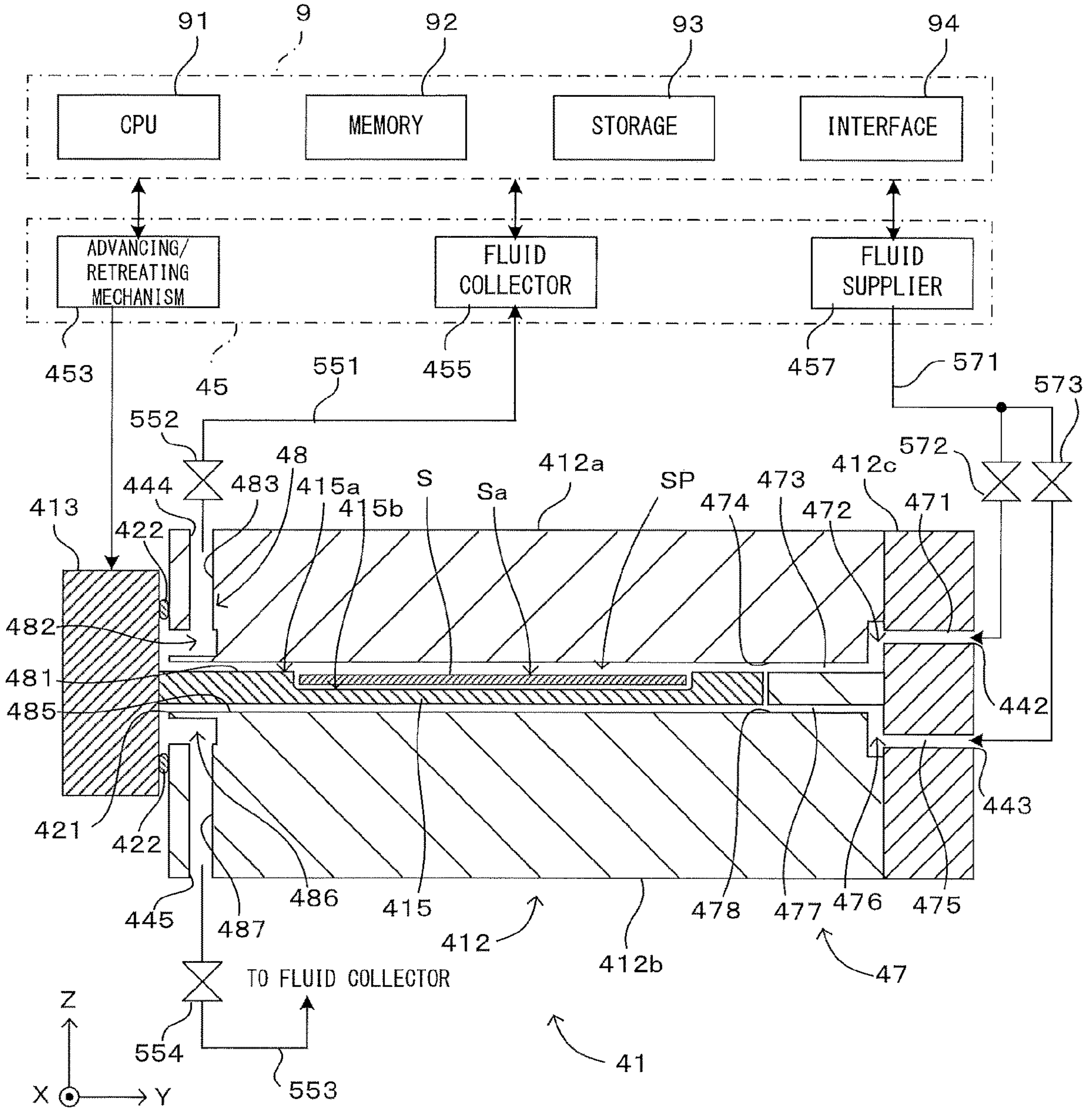
FIG. 5 is a cross sectional view illustrating a detailed structure of the processing unit.

FIG. 5 is a cross sectional view illustrating a detailed structure of the processing unit. As described above, the processing unit 41 includes a processing chamber 412. The processing chamber 412 includes a first member 412*a*, a second member 412*b*, and a third member 412*c* each composed of a metal block. The first member 412*a* and the second member 412*b* are coupled to each other in the vertical direction by a coupling member not shown in the drawings. The third member 412*c* is coupled to respective side surfaces of the first member 412*a* and the second member 412*b* on a (+Y) side by a coupling member not shown in the drawings, thereby forming the processing chamber 412 having a configuration with a hollow interior. This hollow internal space functions as processing space SP for implementation of a process on the substrate S. The substrate S as a target is loaded into the processing space SP and processed therein. An opening 421 like a slit elongated in an X direction is formed at a side surface of the processing chamber 412 on a (−Y) side. The processing space SP and external space communicate with each other through the opening 421.

The fluid supplier 457 outputs a processing fluid for processing the substrate S that is a fluid in a supercritical state or a fluid supplied in a gas form or in a liquid form and to be brought to a supercritical state thereafter by being supplied with a predetermined temperature and a predetermined pressure. For example, carbon dioxide is output in a gas form or in a liquid form. The fluid is fed under pressure to an input port 442 and an input port 443 provided at a side surface of the processing chamber 412 on the (+Y) side through a pipe 571, and a valve 572 and a valve 573 interposed in the pipe 571. Specifically, by opening the valves 572 and 573 in response to a control command from the control unit 9, the fluid is fed from the fluid supplier 457 to the processing chamber 412.

A flow path 417 of the fluid from the input ports 442 and 443 to the processing space SP functions as an introduction flow path for introducing the processing fluid supplied from the fluid supplier 457 into the processing space SP. More specifically, a flow path 471 is connected to the input port 442. The flow path 471 has an end on the opposite side to the input port 442 where buffer space 472 is provided having a flow path sectional area increased steeply.

A flow path 473 is provided further in such a manner as to connect the buffer space 472 and the processing space SP to each other. The flow path 473 has a broad sectional shape narrow in the vertical direction (Z direction) and extending long in a horizontal direction (X direction). This sectional shape is substantially constant in a flow direction of the processing fluid. The flow path 473 has an end on the opposite side to the buffer space 472 that functions as an ejection port 474 having an opening bordering the processing space SP. The processing fluid is introduced through the ejection port 474 into the processing space SP.

Desirably, the height of the flow path 473 is equal to a distance between a ceiling surface of the processing space SP and the upper surface Sa of the substrate S with the support tray 415 housed in the processing space SP. The ejection port 474 is opened while bordering a gap between the ceiling surface of the processing space SP and the upper surface of the support tray 415. For example, a ceiling surface of the flow path 473 and the ceiling surface of the processing space SP may form the same plane. In this way, the ejection port 474 is opened into a slit shape elongated in the horizontal direction while bordering the processing space SP.

A flow path of the processing fluid is formed under the support tray 415 in the same way. More specifically, a flow path 475 is connected to the input port 443. The flow path 475 has an end on the opposite side to the input port 443 where buffer space 476 is provided having a flow path sectional area increased steeply.

The buffer space 476 and the processing space SP communicate with each other through a flow path 477. The flow path 477 has a broad sectional shape narrow in the vertical direction (Z direction) and extending long in the horizontal direction (X direction). This sectional shape is substantially constant in the flow direction of the processing fluid. The flow path 477 has an end on the opposite side to the buffer space 476 that functions as an ejection port 478 having an opening bordering the processing space SP. The processing fluid is introduced through the ejection port 478 into the processing space SP.

Desirably, the height of the flow path 477 is substantially equal to a distance between a bottom surface of the processing space SP and a lower surface of the support tray 415. The ejection port 478 is opened while bordering a gap between the bottom surface of the processing space SP and the lower surface of the support tray 415. For example, a bottom surface of the flow path 477 and the bottom surface of the processing space SP may form the same plane. Specifically, the ejection port 478 is opened into a slit shape elongated in the horizontal direction while bordering the processing space SP.

Desirably, the flow path 471 and the flow path 473 are arranged at positions differing from each other in the Z direction. If the flow paths 471 and 473 are at the same height, part of the processing fluid having flowed from the flow path 471 into the buffer space 472 travels straight directly into the flow path 473. This causes a risk that the flow rate or flow speed of the processing fluid flowing into the flow path 473 will differ between a position corresponding to the flow path 471 and a position not corresponding to the flow path 471 in a width direction of the flow path perpendicular to the flow direction, namely, in the X direction. This causes non-uniformity in the flow of the processing fluid in the X direction flowing from the flow path 473 into the processing space SP to become a cause for a disturbed flow.

Arranging the flow path 471 and the flow path 473 at different positions in the Z direction prevents the occurrence of such straight travel of the processing fluid from the flow path 471 to the flow path 473. As a result, it becomes possible to introduce the processing fluid in a laminar flow uniform in the width direction into the processing space SP.

The processing fluid introduced through the introduction flow path 47 having the foregoing configuration flows along the upper surface and the lower surface of the support tray 415 in the processing space SP and is discharged to the outside of the chamber through a discharge flow path 48 having a configuration described next. Both the ceiling surface of the processing space SP and the upper surface **415*a* of the support tray 415 form horizontal planes on the (−Y) side relative to the substrate S while extending parallel to each other in facing positions with a certain gap maintained therebetween. This gap functions as an upstream path 481 of an upper part of the discharge flow path 48 for guiding the processing fluid having flowed along the upper surface 415*a* of the support tray 415 and the upper surface Sa of the substrate S to a discharge flow path described later. Specifically, the upstream path 481** has a broad sectional shape narrow in the vertical direction (Z direction) and extending long in the horizontal direction (X direction).

The upstream path 481 has an end on the opposite side to the processing space SP that is connected to buffer space 482. While a particular configuration of the buffer space 482 will be described later, the buffer space 482 is space surrounded by the processing chamber 412, the lid member 413, and the seal member 422. The buffer space 482 has a width in the X direction that is substantially equal to or greater than the corresponding width of the upstream path 481, and a height in the Z direction that is greater than the corresponding height of the upstream path 481. Thus, the buffer space 482 has a larger flow path sectional area than the upstream path 481.

A downstream path 483 of the upper part of the discharge flow path 48 is connected to the top of the buffer space 482. The downstream path 483 is a through hole penetrating the first member **412*a* as an upper block forming the chamber 412. The downstream path 483 has an upper end that forms an output port 444 opened at an upper surface of the chamber 412, and a lower end that has an opening bordering the buffer space 482**.

Likewise, both the bottom surface of the processing space SP and the lower surface of the support tray 415 form horizontal planes while extending parallel to each other in facing positions with a certain gap maintained therebetween. This gap functions as an upstream path 485 of a lower part of the discharge flow path 48 for guiding the processing fluid having flowed along the lower surface of the support tray 415 to the fluid collector 455. The upstream path 485 is, as the upper side of the support tray 415, connected to a downstream path 487 of the lower part of the discharge flow path via a buffer space 486.

The processing fluid having flowed over the support tray 415 in the processing space SP is delivered to the output port 444 through the upstream path 481, the buffer space 482, and the downstream path 483 of the upper part of the discharge flow path 48. The output port 444 is connected to a fluid collector 455 through a pipe 551, and a valve 552 is interposed in the pipe 551.

Likewise, the processing fluid having flowed under the support tray 415 in the processing space SP is delivered to the output port 445 through the upstream path 485, the buffer space 486, and the downstream path 487 of the lower part of the discharge flow path 48. The output port 445 is connected to the fluid collector 455 through a pipe 553, and a valve 554 is interposed in the pipe 553.

The valves 552 and 554 are controlled by the control unit 9. By opening the valves 552 and 554 in response to a control command from the control unit 9, the processing fluid in the processing space SP is collected in the fluid collector 455 through the pipes 551 and 553.

Figure 6A:
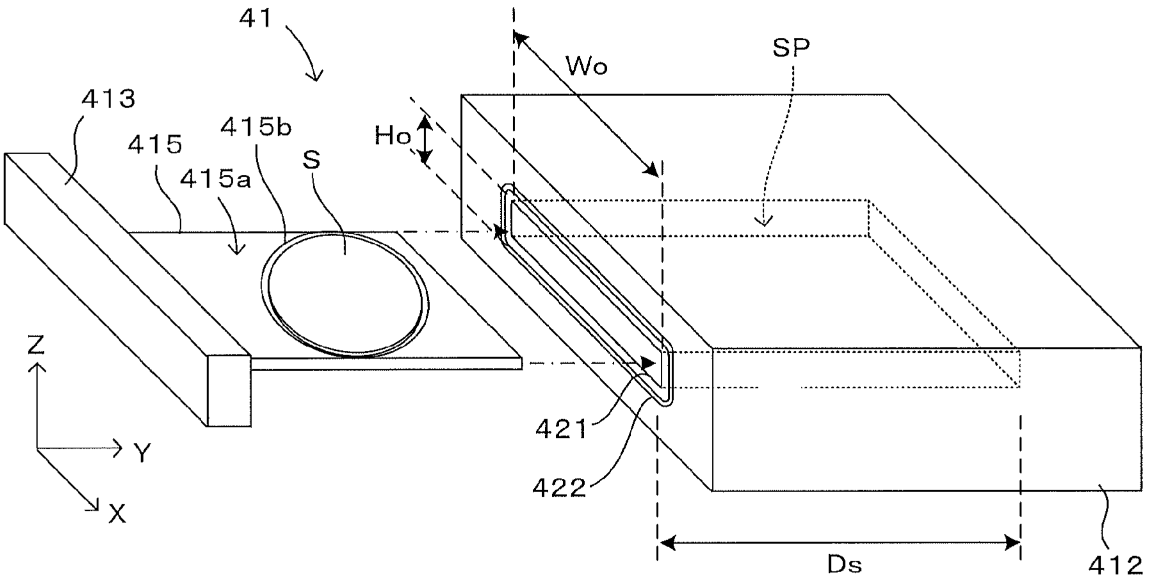
FIG. 6A is a view showing a state where the support tray having the substrate placed thereon is pulled out from the processing space.
Figure 6B:
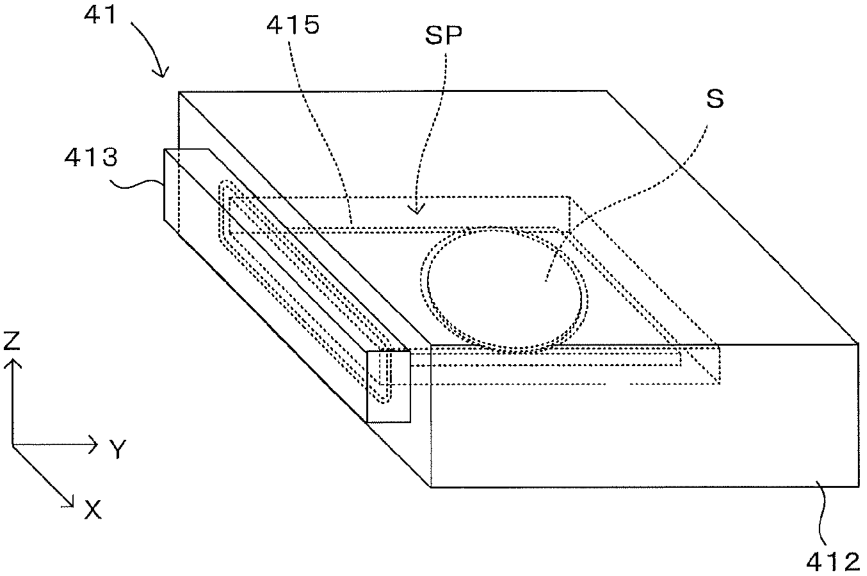
FIG. 6B is a view showing a state where the support tray is accommodated in the processing space.

FIGS. 6A and 6B are views showing a relationship of the support tray and the substrate with the processing space. More specifically, FIG. 6A is a view showing a state where the support tray 415 having the substrate S placed thereon is pulled out from the processing space SP. FIG. 6B is a view showing a state where the support tray 415 is accommodated in the processing space SP.

As shown in FIG. 6A, the recess 415*b* formed to be slightly larger than the plane size of the substrate S is provided in the upper surface 415*a* of the flat plate-like support tray 415, and the substrate S is accommodated into this recess 415*b*. The opening 421 communicating with the processing space SP is provided in an end surface on the (−Y) side of the processing chamber 412. A height (size in the Z direction) Ho and a width (size in the X direction) Wo of the opening 421 are formed to be slightly larger than the height and width of the support tray 415. Further, a cross-sectional shape of the processing space SP in an XZ plane is the same as the shape of the opening 421 regardless of positions in the Y direction. A depth (size in the Y direction) Ds of the processing space SP is slightly larger than a size in the Y direction of the support tray 415.

Thus, as shown in FIG. 6B, only tiny gaps remain between the support tray 415 and the wall surface of the processing space SP with the support tray 415 accommodated in the processing space SP. Thus, the volume of the processing space SP in this state is very small. In this way, the processing space SP can be filled up with a small amount of the processing fluid in the supercritical processing, which contributes not only to a high processing efficiency, but also to resource saving.

Examples of dimensions of the processing space SP are as follows. For example, if the substrate S is a semiconductor wafer having a diameter of 300 mm, the opening height Ho can be 20 to 30 mm, the opening width Wo can be a value slightly larger than 300 mm, and the depth Ds of the processing space SP can be about 400 mm. Note that these numerical values merely are samples. Dimensions are not limited to these values.

Since stain is accumulated inside the processing space SP by repeating the processing, the processing space SP needs to be regularly cleaned. A cleaning attachment, to which the invention is applied, can be used to clean the processing space SP including the opening having a large width, a small height and a large depth as just described. Several embodiments of the cleaning attachment are described with reference to figures below.

Note that the structure of a processing chamber, to which the cleaning attachment of the invention is applied, is not limited to the aforementioned one. That is, the cleaning attachment according to the invention can be applied to processing chambers of various structures including a processing space having a constant cross-sectional shape from an opening to a deep part by appropriately changing a shape according to a cross-sectional shape of the processing chamber. In this case, the shape of the attachment may be modified in response to the cross sectional shape of the processing space.

First to Third Embodiments

Figure 7A:
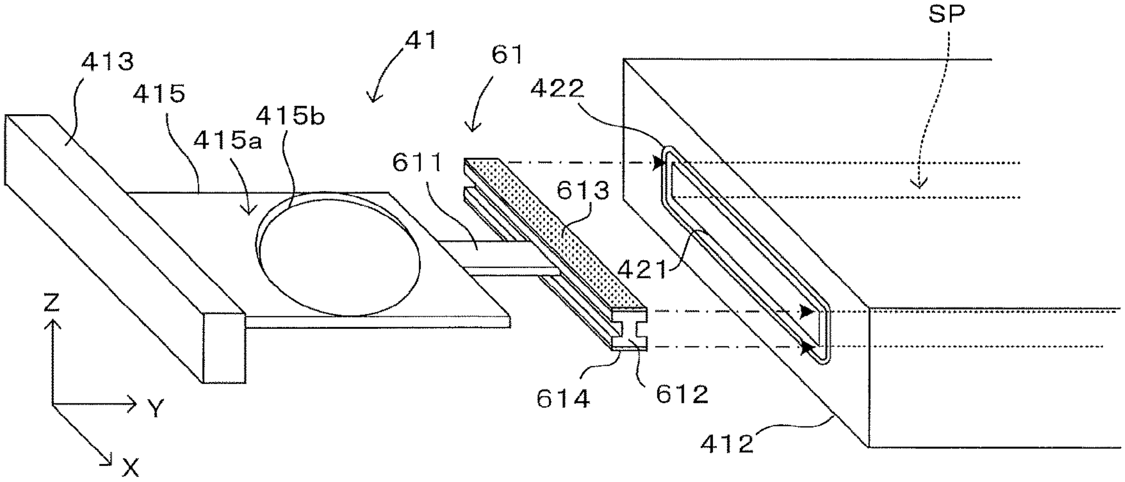
FIG. 7A is a view showing the structure of a cleaning attachment according to the first embodiment of the invention.
Figure 7B:
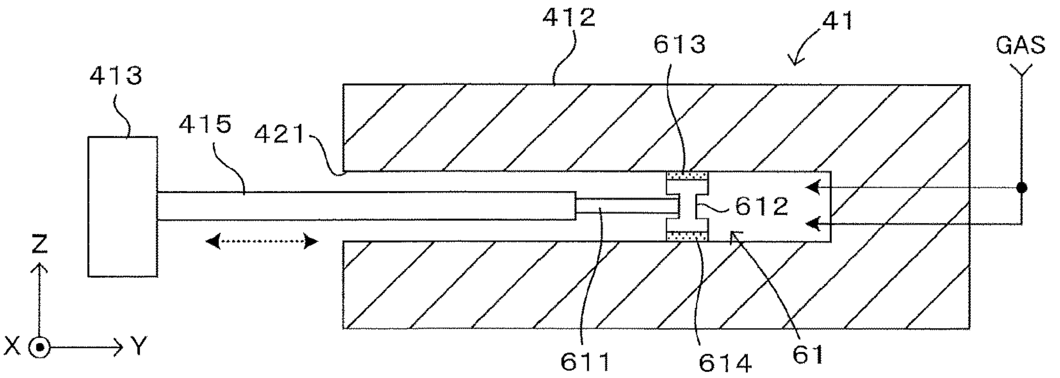
FIG. 7B is a view showing the action of the cleaning attachment.
Figure 7C:
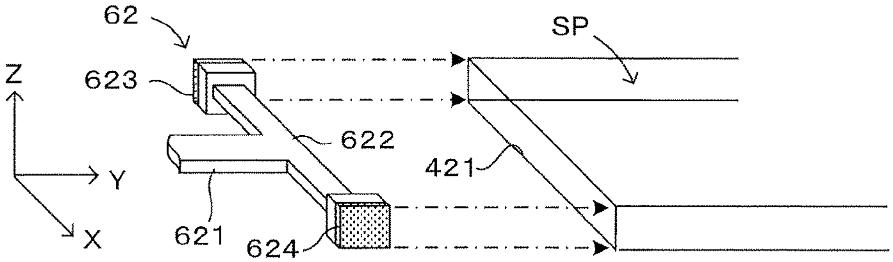
FIG. 7C is a view respectively showing the structures of a cleaning attachment according to the second embodiment.
Figure 7D:
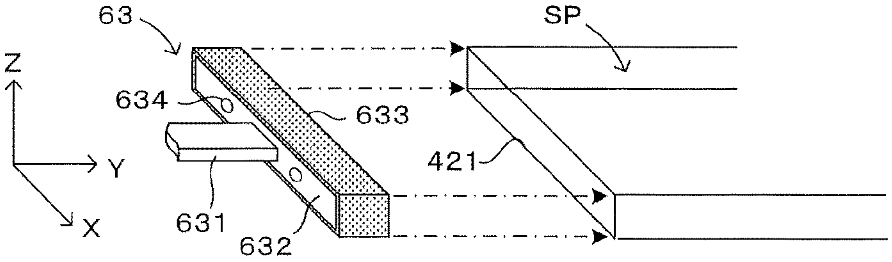
FIG. 7D is a view respectively showing the structures of a cleaning attachment according to the third embodiment.

FIGS. 7A to 7D are views showing first to third embodiments of the cleaning attachment according to the invention. More specifically, FIG. 7A is a view showing the structure of a cleaning attachment 61 according to the first embodiment of the invention, and FIG. 7B is a view showing the action of the cleaning attachment 61. Further, FIGS. 7C and 7D are views respectively showing the structures of a cleaning attachment 62 according to the second embodiment and a cleaning attachment 63 according to the third embodiment of the invention.

As shown in FIG. 7A, the cleaning attachment 61 of the first embodiment is structured such that a cleaning member 612 is provided on the tip of a rod 611 extending in the (+Y) direction from the end surface on the (+Y) side of the support tray 415. The cleaning member 612 is a rod-like member having a longitudinal direction oriented in the X direction. A cross-sectional shape of the cleaning member 612 is substantially H-shaped here, but is arbitrary without being limited to this.

A length in the X direction of the cleaning member 612 is slightly smaller than the opening width Wo of the processing space SP. Further, a height, i.e. a length in the Z direction, of the cleaning member 612 is slightly smaller than the opening height Ho of the processing space SP. The upper and lower ends of the cleaning member 612 are finished to flat surfaces, and wiping members 613, 614 are respectively attached to the upper and lower surfaces of the cleaning member 612. The wiping members 613, 614 can be, for example, formed of a sheet-like porous elastic resin material or fabric. With the wiping members 613, 614 attached to the upper and lower surfaces of the cleaning member 612, an entire height is larger than the opening height Ho of the processing space SP. In other words, thicknesses of the wiping members 613, 614 are set to achieve such a relationship.

When the support tray 415 moves in the (+Y) direction and advances toward the processing space SP, the cleaning attachment 61 attached to the tip of the support tray 415 is inserted into the processing space SP. Then, the wiping member 613 attached to the upper surface of the cleaning member 612 comes into contact with the ceiling surface of the processing space SP and the wiping member 614 attached to the lower surface of the cleaning member 612 comes into contact with the bottom surface of the processing space SP. As shown in FIG. 7B, the support tray 415 moves back and forth with the wiping members 613, 614 held in contact with the ceiling and bottom surfaces of the processing space SP. In this way, the wiping members 613, 614 rub the ceiling and bottom surfaces of the processing space SP and the inside of the processing space SP can be cleaned. To enhance a cleaning effect, the wiping members 613, 614 may be impregnated with an appropriate cleaning liquid in advance.

Further, at this time, a gas flow in the (−Y) direction, i.e. in a direction from a back side of the processing space SP toward the opening 421, is more preferably formed in the processing space SP. By doing so, contaminants separated from the wall surface of the processing space SP by the rubbing of the wiping members 613, 614 can be prevented from staying inside the processing space SP. For example, such a gas flow can be created by supplying an appropriate gas (nitrogen gas, dry air, carbon dioxide gas or the like) to the processing space SP via the flow passages 473, 477 (FIG. 5).

On the other hand, the cleaning attachment 62 of the second embodiment shown in FIG. 7C is structured such that wiping members 623, 624 are attached to both end parts in the X direction of a cleaning member 622 provided on the tip of a rod 621 extending in the (+Y) direction from the end surface on the (+Y) side of the support tray 415. A length in the X direction of the cleaning member 622 is slightly smaller than the opening width Wo, but a length including the wiping members 623, 624 is larger than the opening width Wo. Thus, if the support tray 415 moves in the (+Y) direction and (−Y) direction, the wiping members 623, 624 having entered the processing space SP can rub and clean side wall surfaces of the processing space SP.

In the cleaning attachment 63 of the third embodiment shown in FIG. 7D, a cleaning member 632 extending in the X direction is attached to the tip of a rod 631 extending in the (+Y) direction from the end surface on the (+Y) side of the support tray 415. A length in the X direction of the cleaning member 632 is slightly smaller than the opening width Wo, and a height thereof is slightly smaller than the opening height Ho. A wiping member 633 is attached to surround the outer peripheral surface, i.e. the upper, side and lower surfaces, of the cleaning member 632. A total width of the cleaning member 632 and the wiping member 633 is larger than the opening width Wo and, and a total height is larger than the opening height Ho.

The cleaning attachment 63 having such a configuration moves in the Y direction by back and forth movements of the support tray 415 with respect to the processing chamber 412. By doing so, the ceiling surface, bottom surface and side wall surfaces constituting the processing space SP are simultaneously wiped. Note that since the cleaning attachment 63 acts to close the processing space SP in this structure, through holes 634 may be provided to penetrate through the cleaning member 632 in the Y direction to release the gas.

As described above, the cleaning attachments 61 to 63 of the first to third embodiments move in the Y direction according to back and forth movements of the support tray 415. In this way, at least one of the ceiling surface, bottom surface and side wall surfaces constituting the processing space SP is wiped and, in this way, the cleaning in the processing chamber 412 is realized. Note that the cleaning member 612 or the like may directly contact the wall surface of the processing space SP, and the wiping member(s) may not be provided. This applies also to other embodiments described later.

<Structure of Attachment Mounting Part>

Figure 8A:
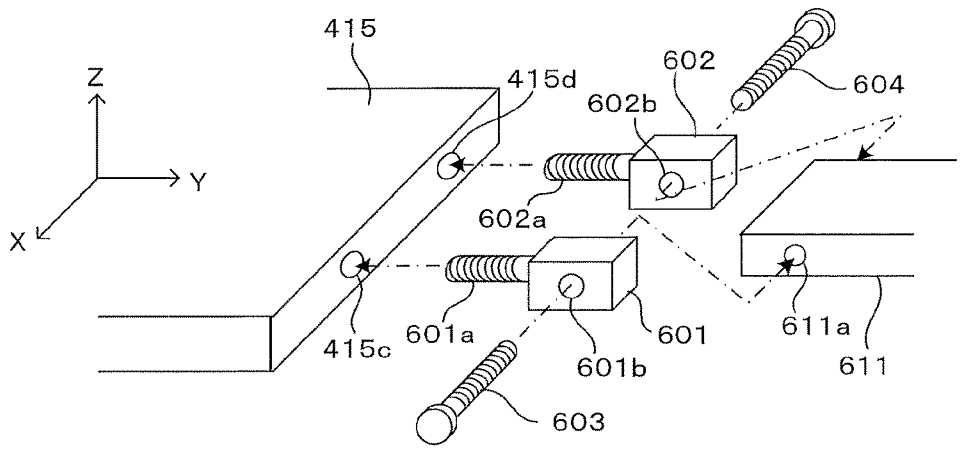
FIGS. 8A to 8C are views showing the structure of a mounting part for the cleaning attachment to the support tray.
Figure 8B:
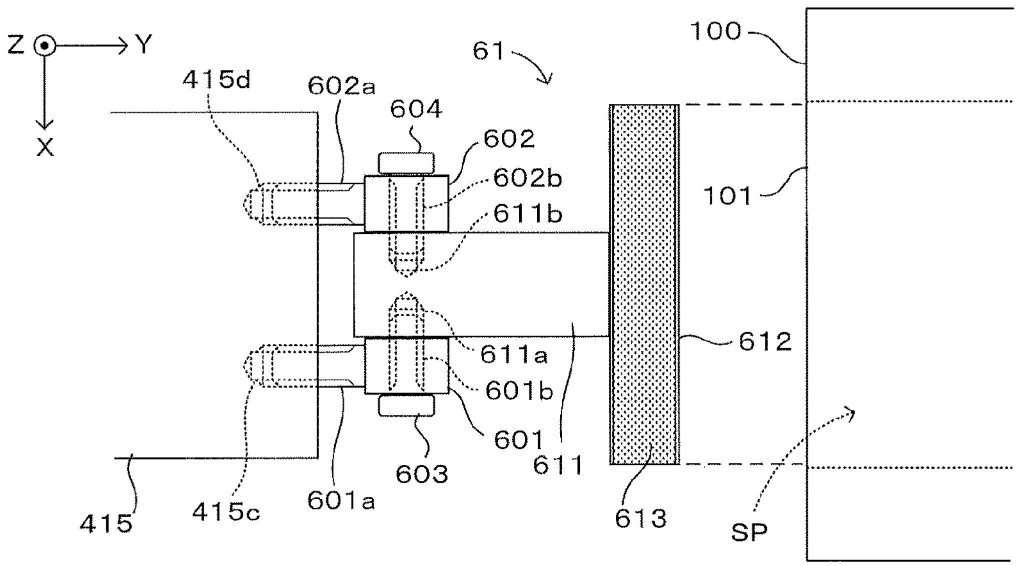
Figure 8C:
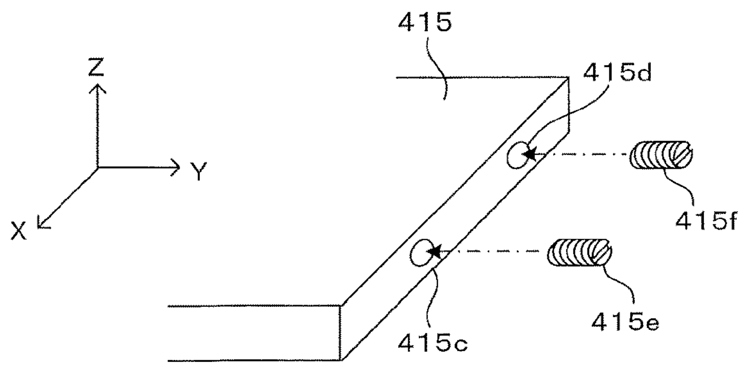

FIGS. 8A to 8C are views showing the structure of a mounting part for the cleaning attachment to the support tray. The cleaning attachment 61 of the first embodiment is described as an example here. However, a common structure can be adopted in each embodiment for the structure of the mounting part.

As shown in FIGS. 8A and 8B, two screw holes 415*c*, 415*d* are provided in the end surface on the (+Y) side of the support tray 415. Coupling members 601, 602 respectively including male screw parts 601*a*, 602*a* are respectively threadably engaged with these screw holes 415*c*, 415*d*.

Through holes 601*b*, 602*b* are provided in end parts of the coupling members 601, 602 on sides opposite to the male screw parts 601*a*, 602*a*. Screw members 603, 604 are inserted into these through holes 601*b*, 602*b*. The screw members 603, 604 are respectively threadably engaged with screw holes 611*a*, 611*b* provided in the rod 611 of the cleaning attachment 61. In this way, the cleaning attachment 61 is coupled to the support tray 415.

If no cleaning attachment is attached to the support tray 415, the screw holes 415*c*, 415*d* are closed by appropriate plug members. For example, as shown in FIG. 8C, set screws 415*e*, 415*f* can be used as the plug members. By closing the screw holes 415*c*, 415*d* with the plug members, the flow of the processing fluid can be prevented from being disturbed by the screw holes 415*c*, 415*d* when the supercritical processing is performed.

Unless the wiping member 613 and the like are made of fabric, the cleaning attachments 61 to 63 and each member constituting the mounting part thereof are made of a resin material. For example, a clean resin material chemically stable and having an appropriate elasticity such as a fluororesin, e.g. PTFE (polytetrafluoroethylene) resin or PFA (perfluoroalkoxy alkane) can be suitably applied.

If these members are, for example, made of a metal material, fine powder produced by the rubbing of metals at the time of mounting to and removing from the support tray 415 may remain in the processing space SP and become a contamination source. By using the members formed of the resin material, such a problem can be avoided. Note that it is not necessary to form all the members of the resin material and metal parts and resin parts may be appropriately combined as long as the rubbing of metals is not caused. Further, the surfaces of the parts may be formed of a resin material and metal parts may be embedded inside.

Fourth Embodiment

Figure 9A:
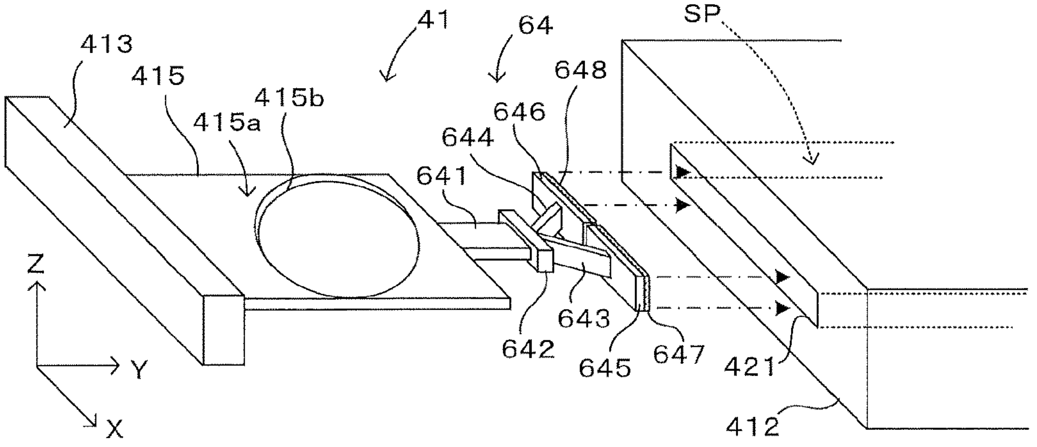
FIGS. 9A to 9C are views showing a fourth embodiment of the cleaning attachment according to the invention.
Figure 9B:
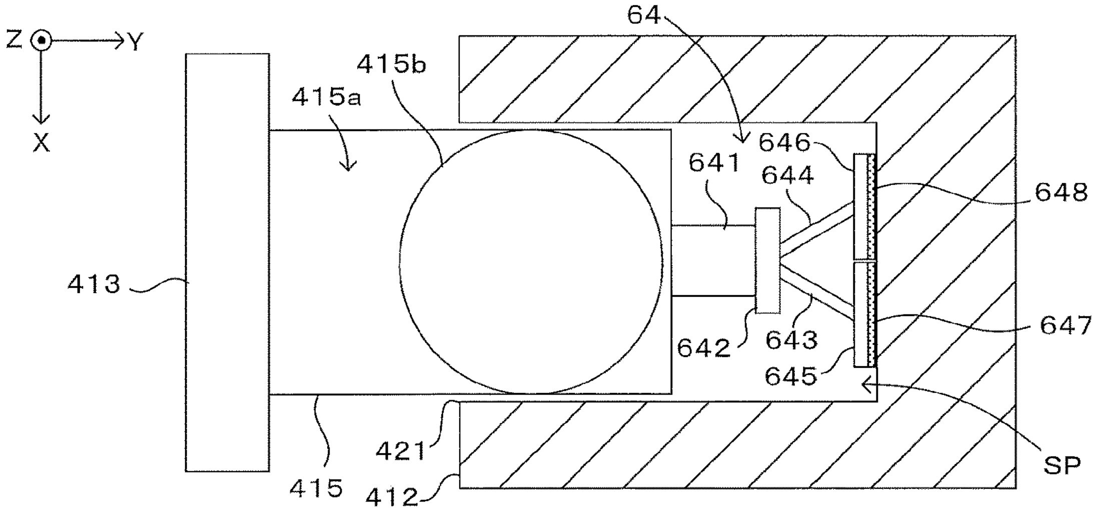
Figure 9C:
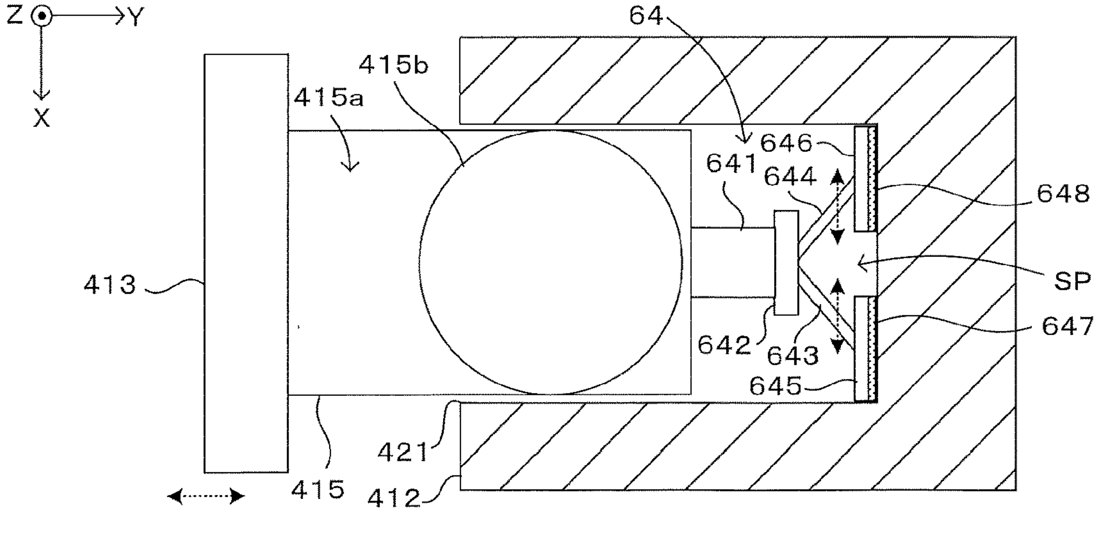

FIGS. 9A to 9C are views showing a fourth embodiment of the cleaning attachment according to the invention. As shown in FIG. 9A, in a cleaning attachment 64 of the fourth embodiment, a base part 642 is provided on the tip of a rod 641 extending in the (+Y) direction from the end surface on the (+Y) side of the support tray 415. Two arms 643, 644 respectively extend in oblique directions from an end surface on the (+Y) side of the base part 642. That is, out of these arms, the arm 643 provided on the (+X) side extends in a direction having a (+X) direction component and a (+Y) direction component, whereas the arm 644 provided on the (−X) side extends in a direction having a (−X) direction component and a (+Y) direction component. The arms 643, 644 are formed of an elastic resin material. These may be, for example, formed integrally with the base part 642.

Cleaning members 645, 646 are provided close to each other in the X direction on the tips of these arms 643, 644. Heights, i.e. lengths in the Z direction, of the cleaning members 645, 646 are slightly smaller than the opening height Ho of the processing space SP. On the other hand, in the X direction, the sum of lengths of the cleaning members 645, 646 is significantly smaller than the opening width Wo. End surfaces on the (+Y) side of the cleaning members 645, 646 are finished to flat surfaces, and wiping members 647, 648 are respectively attached.

If the support tray 415 moves in the (+Y) direction, the cleaning attachment 64 enters the processing space SP and, as shown in FIG. 9B, the wiping members 647, 648 provided on the tips of the cleaning members 645, 646 come into contact with the wall surface on the (+Y) side of the processing space SP. If the support tray 415 moves further in the (+Y) direction from this state, the arms 643, 644 are respectively elastically deformed outward in the X direction, whereby the cleaning members 645, 646 are also respectively displaced outward in the X direction.

As indicated by dotted line arrows in FIG. 9C, if the support tray 415 moves back and forth in the (+Y) direction and (−Y) direction with the wiping members 647, 648 held in contact with the side wall surface on the (+Y) side of the processing space SP, the wiping members 647, 648 attached to the cleaning members 645, 646 reciprocally move in the X direction, whereby the side wall surface on the (+Y) side of the processing space S is wiped. In this way, the side wall surface on the (+Y) side of the processing space S can be cleaned.

Fifth Embodiment

Figure 10A:
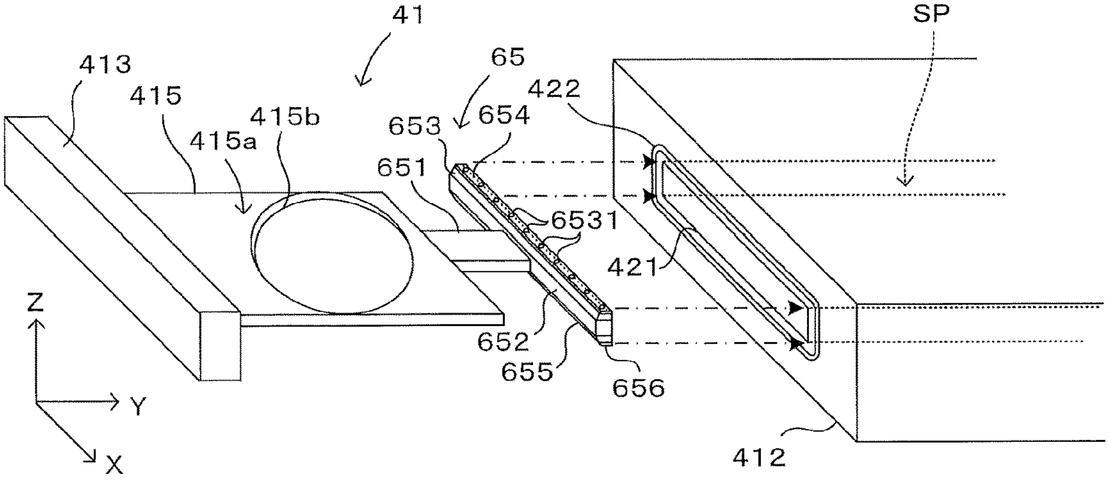
FIGS. 10A to 10D are views showing a fifth embodiment of the cleaning attachment according to the invention.
Figure 10B:
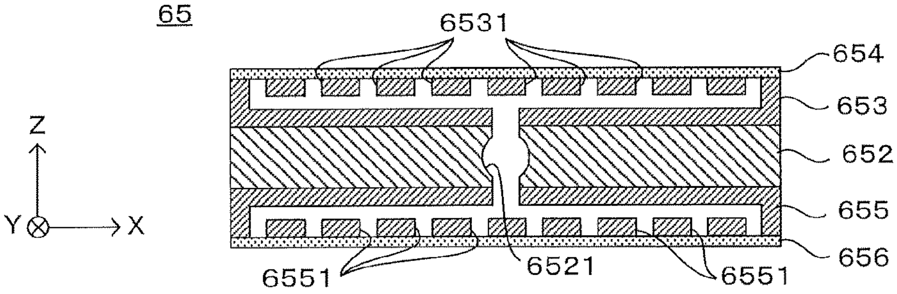
Figure 10C:
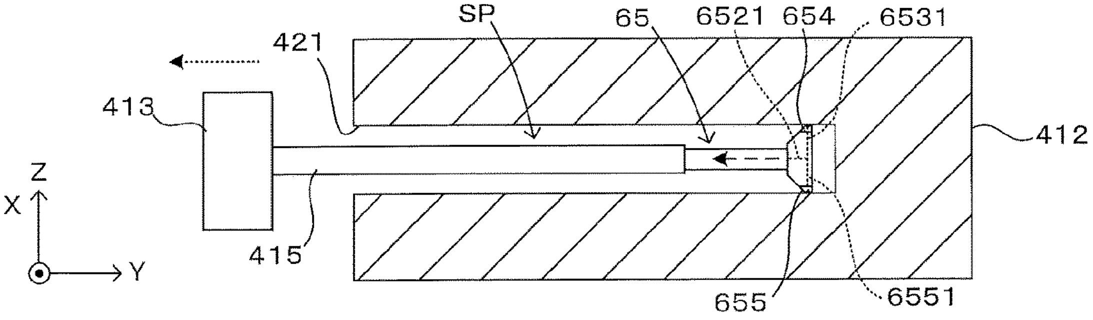

FIGS. 10A to 10C are views showing a fifth embodiment of the cleaning attachment according to the invention. As shown in FIG. 10A, in a cleaning attachment 65 of the fifth embodiment, a base part 652 is provided on the tip of a rod 651 extending in the (+Y) direction from the end surface on the (+Y) side of the support tray 415. The base part 652 is a rod-like member extending in the X direction, and a length in the X direction thereof is slightly smaller than the opening width Wo of the processing space SP and a length in the Z direction thereof is sufficiently smaller than the opening height Ho.

A multi-hole nozzle 653 is provided on the upper end of the base part 652, and a wiping member 654 is attached to the upper surface of the multi-hole nozzle 653. A plurality of discharge ports 6531 are provided in the upper surface of the multi-hole nozzle 653. On the other hand, a multi-hole nozzle 655 is provided on the lower end of the base part 652, and a wiping member 656 is attached to the lower surface of the multi-hole nozzle 655. A plurality of discharge ports 6551 are provided in the lower surface of the multi-hole nozzle 655. The sum of heights of the base 652 and the multi-hole nozzles 653, 655 is slightly smaller than the opening height Ho, but a total height when heights of the wiping members 654, 656 are further added is larger than the opening height Ho. Therefore, when this cleaning attachment 65 enters the processing space SP, the wiping member 654 contacts the ceiling surface of the processing space SP and the wiping member 656 contacts the bottom surface of the processing space SP.

FIG. 10B is a sectional view along an XZ plane showing the internal structure of the cleaning attachment 65. As shown in FIG. 10B, each discharge port 6531 of the multi-hole nozzle 653 and each discharge port 6551 of the multi-hole nozzle 655 respectively communicate with flow passages 6521 provided inside the base part 652. Any of the flow passages 6521 is connected to an unillustrated suction mechanism or injection mechanism.

If the suction mechanism is connected to the flow passages 6521, the multi-hole nozzles 653, 655 act to draw a surrounding atmosphere by having a negative pressure fed thereto. When the cleaning attachment 65 is in the processing space SP, the wiping members 654, 656 rub the ceiling and bottom surfaces of the processing space SP according to a movement of the support tray 415 in the Y direction and the multi-hole nozzles 653, 655 suck the surrounding atmosphere as indicated by a broken line arrow as shown in FIG. 10C. Therefore, contaminants removed from the ceiling and bottom surfaces of the processing space SP by the wiping members 654, 656 are sucked and discharged from the processing space SP by the multi-hole nozzles 653, 655. In this way, the processing space SP is cleaned.

Figure 10D:
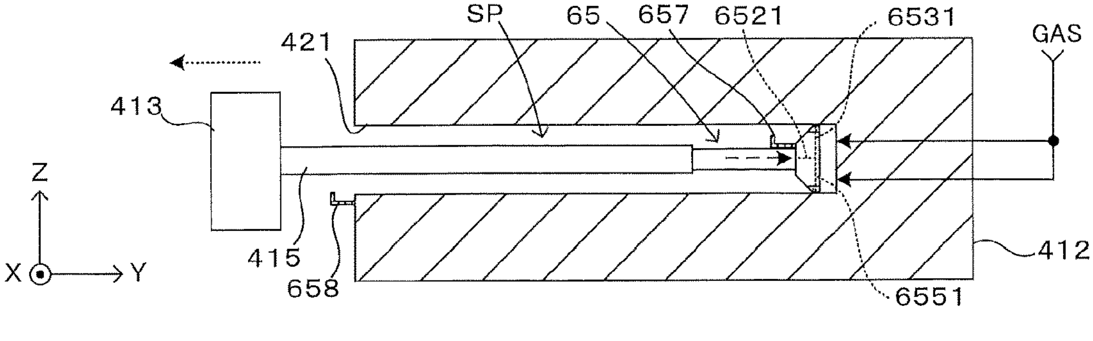

On the other hand, if the injection mechanism is connected to the flow passages 6521, an appropriate fluid is supplied toward the multi-hole nozzles 653, 655 and injected to the processing space SP from the discharge ports 6531, 6551. A gas such as a nitrogen gas or dry air or a liquid such as a cleaning liquid can be used as the fluid in this case. As shown by a broken line arrow in FIG. 10D, the fluid is supplied to the multi-hole nozzles 653, 655 via the flow passages 6521 and the cleaning attachment 65 moves in the Y direction in the processing space SP while injecting the fluid. Therefore, the inside of the processing space SP can be cleaned.

In this case, contaminants adhering to the wall surface of the processing space SP are swept away and removed by the fluid. To collect the contaminants removed in this way, contaminant receivers 657, 658 may be provided. Out of these, the contaminant receiver 657 is attached to an upper part of the base part 652 and receives contaminants separated from the ceiling surface of the processing space SP by fluid injection from the multi-hole nozzle 653. On the other hand, the contaminant receiver 658 is arranged below the opening 421 of the processing chamber 412 and receives contaminants separated from the bottom surface of the processing space SP by fluid injection from the multi-hole nozzle 655 and scraped out by a movement of the cleaning attachment 65 in the (−Y).

To prevent the fluid discharged from the multi-hole nozzles 653, 655 from flowing into the flow passages 473, 477 (FIG. 5), an appropriate gas is desirably supplied to the flow passages 473, 477 from outside also in this embodiment.

<Miscellaneous>

Each of the cleaning attachments 61 to 65 configured as described above is removed when the supercritical drying apparatus 4 performs the supercritical drying processing. Any one of the cleaning attachments is attached to the support tray 415 not supporting the substrate S at a predetermined timing, e.g. during regular maintenance, by the operation of an operator. If necessary, the wiping member(s) is/are impregnated with a cleaning liquid in advance.

In response to a control command from the controller 9, the advancing/retreating mechanism 453 reciprocally moves the lid member 413 in the Y direction. According to a movement of the support tray 415 integrated with the lid member 413 in the Y direction, the cleaning attachment 61 to 65 moves back and forth in the processing space SP, whereby the wall surface of the processing space SP is cleaned.

As described above, in each of the above embodiments, the support tray 415 corresponds to a “supporting member” of the invention. Further, the processing chamber 412 corresponds to a “chamber body” of the invention, and the processing chamber 412 and the lid member 413 integrally constitute a “supercritical processing chamber” of the invention.

Further, in each of the above embodiments, the coupling members 601, 602 function as an “engager” and a “coupling member” of the invention. Further, each of the rods 611, 621, 631, 641, 651 functions as a “connector” of the invention. Further, in the first to fourth embodiments, each of the cleaning members 612, 622, 632, 645, 646 is combined with the wiping member 613, 614, 623, 624, 633, 647, 648 to integrally constitute a “cleaner” of the invention.

Further, in the fifth embodiment, the base part 652 and the wiping members 655, 656 integrally constitute the “cleaner”. Furthermore, the multi-hole nozzles 653, 655 function as a “suction nozzle” of the invention when being connected to the suction mechanism and, on the other hand, function as a "discharge nozzle" when being connected to the injection mechanism.

<Other Embodiment of Cleaning Processing>

In this embodiment, the inside of the processing chamber 412, more specifically, the inner wall surface of the processing chamber 412 constituting the processing space SP, is cleaned by introducing a cleaning liquid into the processing space SP from outside instead of physical cleaning.

Figure 11:
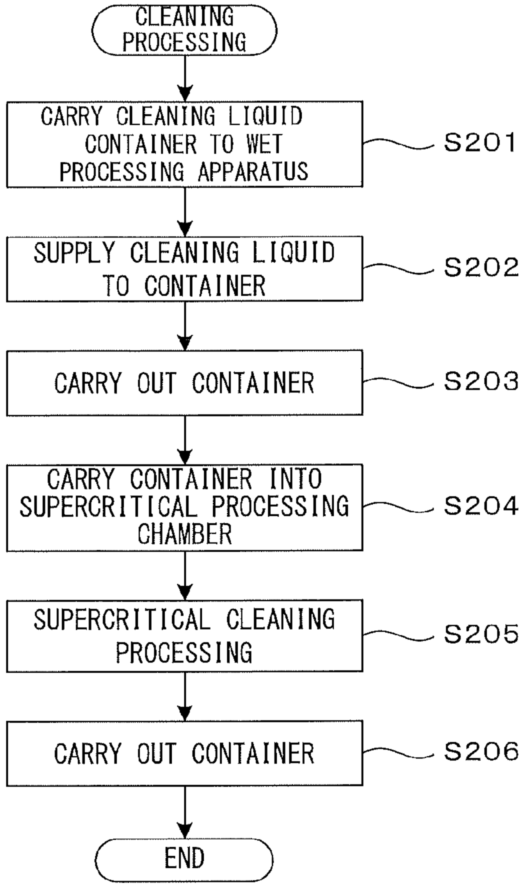
FIG. 11 is a flow chart showing contents of the cleaning processing for the processing chamber.

FIG. 11 is a flow chart showing contents of the cleaning processing for the processing chamber. In the cleaning processing of this embodiment, a cleaning liquid container (hereinafter, may be merely referred to as a "container") 70 prepared for the cleaning processing is transported from the container stocker 7 to the wet processing apparatus 2 (Step S201). The wet processing apparatus 2 supplies an appropriate cleaning liquid to the carried-in cleaning liquid container 70 (Step S202). In this way, the cleaning liquid container 70 storing the cleaning liquid is carried out from the wet processing apparatus 2 by the center robot 30 (Step S203) and carried into the processing chamber 412 of the supercritical processing apparatus 4 (Step S204).

After the processing space SP is sealed, the processing fluid is supplied to the processing space SP from the fluid supplier 457 and enters a supercritical state in the processing space SP. In this way, the cleaning liquid is dissolved into the processing fluid having a reduced surface tension and widely spreads in the processing space SP under a high pressure. As a result, the inner wall surface of the processing chamber 412 constituting the processing space SP is effectively cleaned (Step S205). In this specification, a processing of cleaning the inside of the processing chambers 412 by filling the processing space SP having the cleaning liquid introduced thereinto in this way with the processing fluid in the supercritical state may be referred to as a "supercritical cleaning processing" or shortly a "cleaning processing".

After a state where the processing space SP is filled with the supercritical processing fluid is continued for a certain period, the processing fluid is discharged from the processing space SP and collected by the fluid collector 455. At this time, contaminants separated from the inner wall surface of the processing chamber 412 and the cleaning liquid are also discharged together with the processing fluid, whereby the inside of the processing chamber 412 is cleaned. The cleaning liquid container 70 is pulled out to outside by a movement of the lid member 43 in the (−Y) direction and the center robot 30 takes out the cleaning liquid container 70 and returns the cleaning liquid container 70 to the container stocker 7 (Step S206), whereby the cleaning processing is finished.

Supply and discharge modes of the processing fluid (carbon dioxide) in the supercritical cleaning processing, i.e. a supply/discharge recipe, can be, for example, similar to a supply/discharge recipe in the supercritical drying processing for the substrate S. By doing so, it is not necessary to prepare a special supply/discharge recipe for the cleaning processing. For example, a supply/discharge recipe obtained by combining a supply recipe for pressurizing the processing fluid introduced in a gas or liquid phase into the processing space SP and bringing the processing fluid into the supercritical state in the processing space SP and a discharge recipe for decompressing the processing space SP, changing the phase of the processing fluid to the gas phase from the supercritical state and discharging the processing fluid can be applied.

Note that, the liquid adhering to the substrate S needs to be replaced by the processing fluid and discharged to the outside of the processing space SP during carry-in in the supercritical drying processing. Therefore, a period during which the supercritical state is maintained is set to be relatively long. On the other hand, this period may be short in the supercritical cleaning processing. Further, a discharge recipe is set to vaporize the processing fluid from the supercritical state without via the liquid phase to prevent the collapse of the fine pattern formed on the substrate S in the supercritical drying processing. However, the problem of pattern collapse needs not be considered in the supercritical cleaning processing. Therefore, for example, the processing fluid may be discharged in a liquid phase state. By doing so, the cleaning liquid containing contaminants after the processing can be efficiently discharged together with the processing fluid in the liquid phase.

Figure 12A:
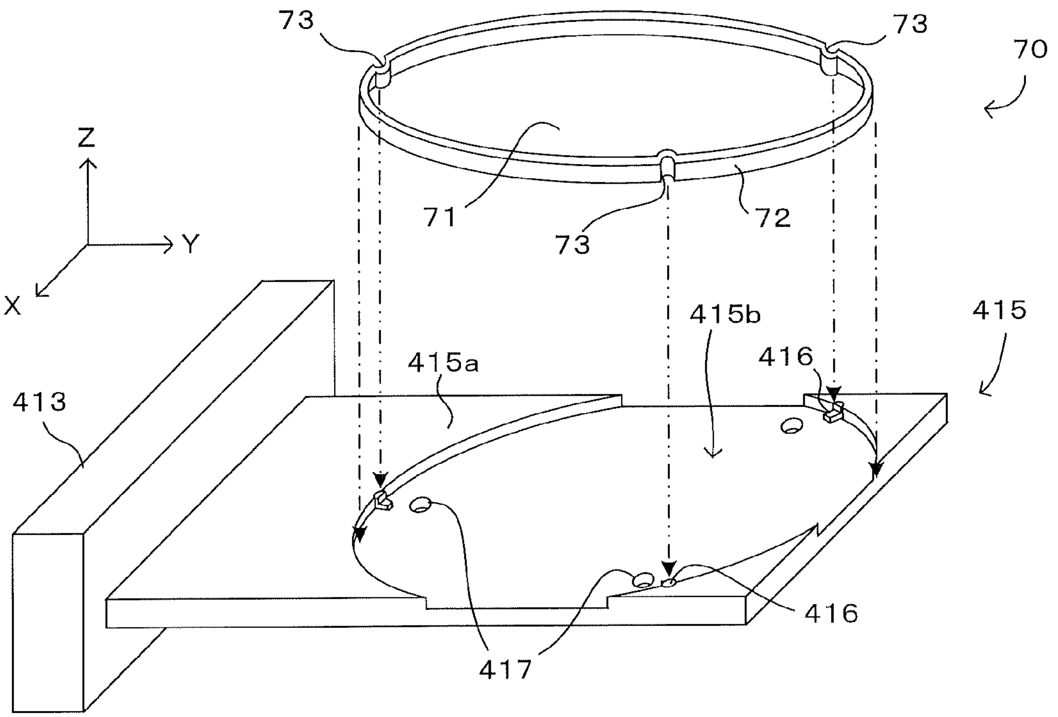
FIG. 12A is a view showing the structure of the cleaning liquid container.
Figure 12B:
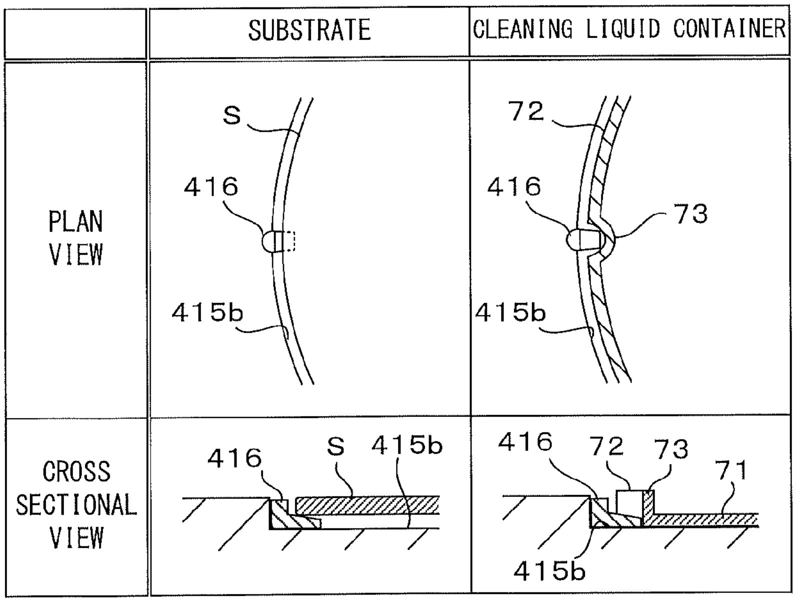
FIG. 12B is a chart showing the dimensional relationship of the cleaning liquid container with the support tray.

FIGS. 12A and 12B are a view and a chart showing the structure of the cleaning liquid container and dimensional relationship of the cleaning liquid container with the support tray. As shown in FIG. 12A, the cleaning liquid container 70 is a flat dish-like container having a substantially disk-like outer shape and a side wall surface 72 extending upward from an outer peripheral part of a flat bottom surface 71. A space surrounded by the bottom surface 71 and the side wall surface 72 functions as a storage space for storing the cleaning liquid. That is, in the cleaning processing, the cleaning liquid is carried into the processing space SP while being stored in the storage space of the cleaning liquid container 70.

Although the cleaning liquid can be carried in also by forming a liquid film on a flat plate-like member, e.g. the substrate S, a larger amount of the cleaning liquid can be reliably brought into the processing space SP by using such a dedicated container, whereby a cleaning effect can be enhanced. Further, the consumption of substrates for cleaning can be avoided. Further, a container can be formed of a material corresponding to a composition of the cleaning liquid.

An outer diameter of the cleaning liquid container 70 is substantially equal to that (e.g. a diameter of 30 mm) of the substrate S. Further, a height is slightly larger than the thickness of the substrate S, is so dimensioned that the cleaning liquid container 70 can be accommodated into the processing space SP without any problem, and can be, for example, about 1 to 2 mm. A resin material, glass, stainless steel or the like can be used as a material of the cleaning liquid container 70. Besides, a silicon wafer cut out to the above thickness can be, for example, cut and used.

As shown in FIG. 12A, the recess 415*b* having such a plane size that the substrate S can be accommodated in a horizontal posture is formed in the upper surface 415*a* of the support tray 415. Further, a plurality of (three in this case example) support pins 416 for holding the substrate S separated from the upper surface of the recess 415*b* are disposed on a peripheral edge part of the recess 415*a*. Therefore, when the substrate S is placed on the support tray 415, the substrate S is accommodated inside the recess 415*b* and supported in the horizontal posture while being slightly separated from the upper surface of the recess 415*b* by contacting the upper surfaces of the support pins 416 as shown in a top view and a sectional view in a left column of FIG. 12B.

In the cleaning processing, the cleaning liquid container 70 is placed on the support tray 415 instead of the substrate S. Cuts 73 are preferably provided at positions corresponding to the disposed positions of the support pins 416 on the side wall surface 72 of the cleaning liquid container 70. As shown in a top view and a sectional view in a right column of FIG. 12B, the cleaning liquid container 70 can be accommodated into the recess 415*b* with the bottom surface thereof held in contact with the upper surface of the recess 415*b* by placing the cleaning liquid container 70 on the support tray 415 such that the cuts 73 correspond to the positions of the support pins 416. By such a structure, the height of the cleaning liquid container 70 can be maximized within a range that the cleaning liquid container 70 can be accommodated in the processing space SP, and more cleaning liquid can be stored.

The operation of each part of the apparatus in a series of flows of the cleaning processing described above is described below with reference to FIGS. 13A to 13D and 14A to 14D. FIGS. 13A to 13D are diagrams schematically showing movements of the wet processing apparatus and the center robot in the cleaning processing. FIGS. 14A to 14D are diagrams schematically showing movements of the supercritical processing apparatus and the center robot in the cleaning processing.

Figure 13A:
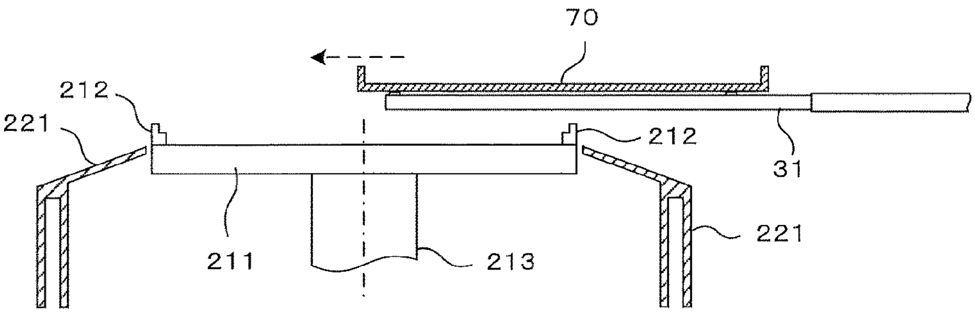
FIGS. 13A to 13D are diagrams schematically showing movements of the wet processing apparatus and the center robot in the cleaning processing.

In Step S201 of the cleaning processing, as shown in FIG. 13A, the hand 31 of the center robot 30 holds and conveys the empty cleaning liquid container 70 and places the cleaning liquid container 70 on the spin chuck 211 of the wet processing apparatus 2. Since the cleaning liquid container 70 has substantially the same diameter as the substrate S, the cleaning liquid container 70 is supported by the chuck pins 212 provided on the peripheral edge part of the spin chuck 211.

Figure 13B:
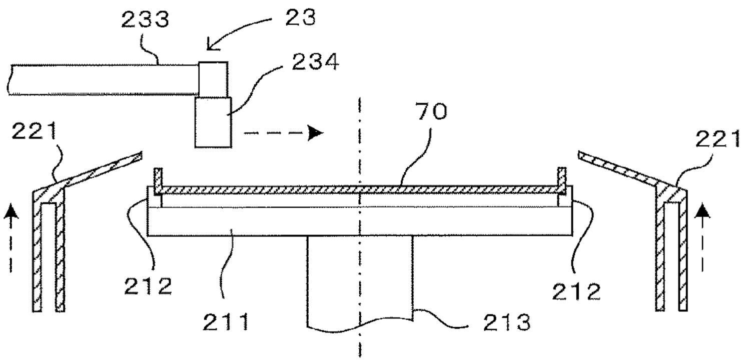
Figure 13C:
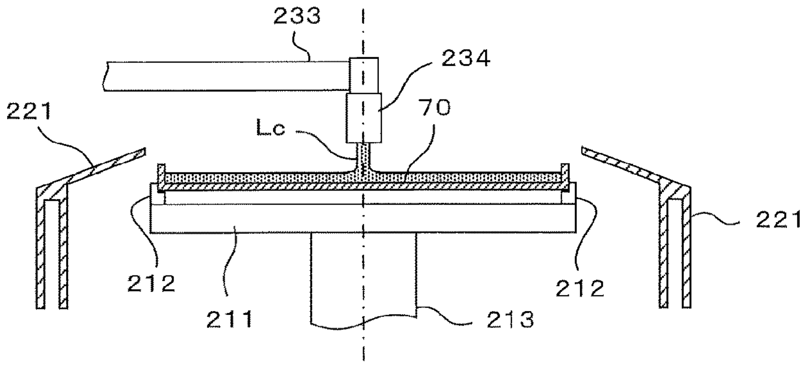
Figure 13D:
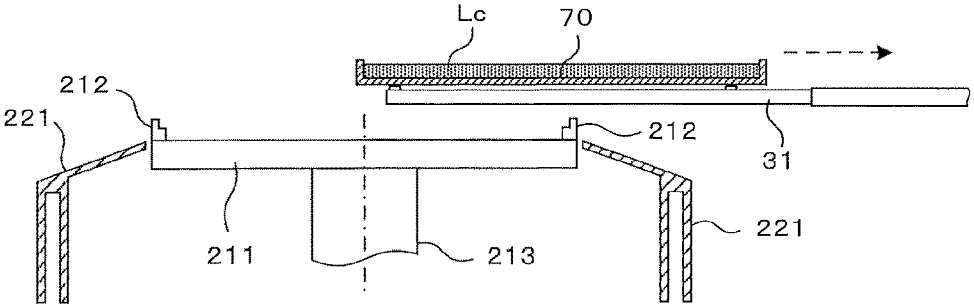

From this state, as shown in FIG. 13B, one of the processing liquid suppliers (first processing liquid supplier 23 in this example) operates and the nozzle 234 moves to above the cleaning liquid container 70. Then, as shown in FIG. 13C, a cleaning liquid Lc is discharged from the nozzle 234 and stored into the storage space of the cleaning liquid container 70 (Step S202). After a predetermined amount of the cleaning liquid is poured, the cleaning liquid container 70 is carried out from the wet processing apparatus 2 while being supported by the hand 31 of the center robot 30 again as shown in FIG. 13D (Step S203). Note that although the cup 221 of the splash guard 22 is raised and lowered here as the processing proceeds as in the case of the wet processing, the cup 221 may be positioned at the lower position.

Figure 14A:
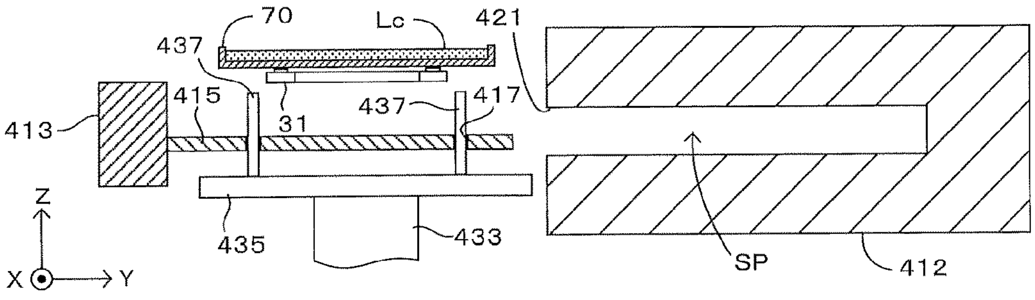
FIGS. 14A to 14D are diagrams schematically showing movements of the supercritical processing apparatus and the center robot in the cleaning processing.
Figure 14B:
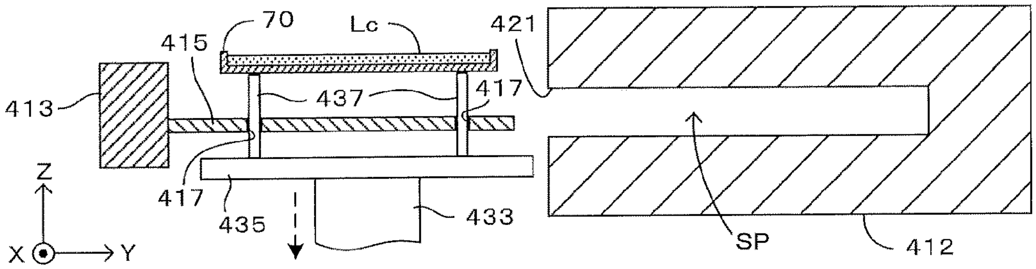
Figure 14C:
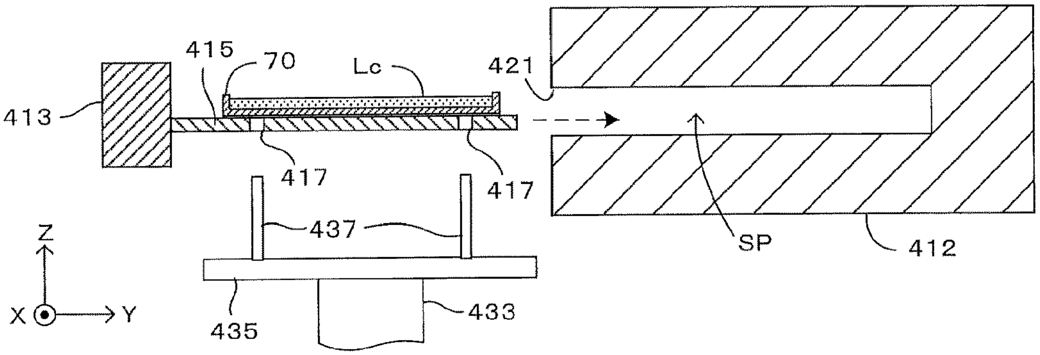
Figure 14D:
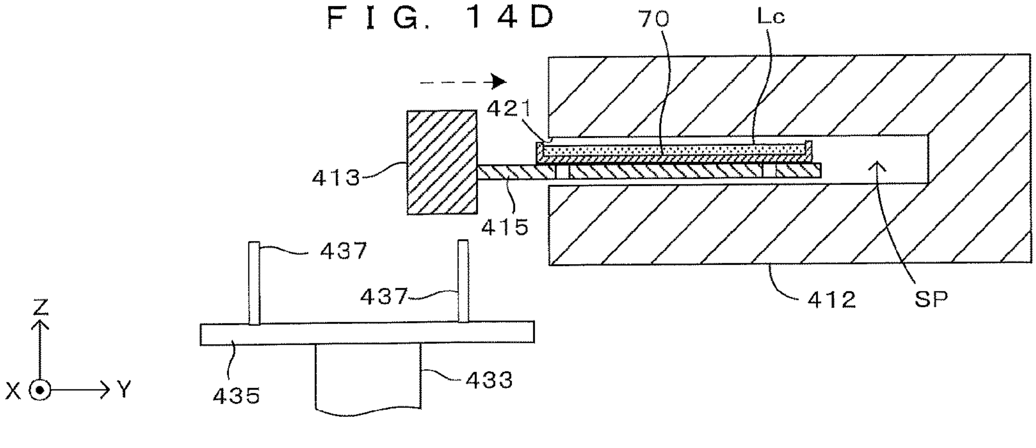

The center robot 30 conveys the cleaning liquid container 70 to the supercritical processing apparatus 4. Then, as shown in FIGS. 14A and 14B, the cleaning liquid container 70 is transferred from the hand 31 to the lift pins 437. As shown in FIG. 14C, the cleaning liquid container 70 is placed on the support tray 415 by lowering the lift pins 437, and is accommodated into the processing space SP together with the support tray 415 by a movement of the lid member 413 in the (+Y) direction. In this way, the cleaning liquid Lc is carried into the processing space SP in the processing chamber 412 (Step S204). Then, the processing fluid is supplied into the processing space SP and brought to the supercritical state, whereby the cleaning of the inside of the processing chamber 412 is realized (Step S205). Note that although the container 70 is placed on the flat upper surface of the support tray 415 for simplification in FIG. 14A and the like, the container 70 is actually accommodated into the recess 415*b* provided in the upper surface of the support tray 415 as shown in FIG. 12A.

Although the cleaning liquid Lc is supplied from the first processing liquid supplier 23 in the wet processing apparatus 2 here, a processing liquid supplier specialized in supplying the cleaning liquid Lc may be separately provided. Further, a plurality of types of liquids may be supplied from one or more processing liquid supply sources and these may be mixed in the cleaning liquid container 70 and function as a cleaning liquid.

Various liquids, which are dissolved into the processing fluid (carbon dioxide in this example) and exert the cleaning action, can be used as the cleaning liquid. For example, various organic solvents, e.g. IPA and acetone, can be used for the purpose of removing organic substances remaining in the processing space SP. For example, the cleaning liquid Lc mainly contains the same type of liquid as the liquid for constituting the liquid film to be formed on the substrate S in the supercritical drying processing. By doing so, new pipe and supply source need not be provided in the wet processing apparatus 2 to pour the cleaning liquid Lc into the cleaning liquid container 70.

Since the cleaning processing is performed in a state where no substrate is present in the processing space SP, a liquid, which cannot be used under the presence of a substrate, can be introduced. For example, in the case of using a liquid mainly containing water as the cleaning liquid, carbonic acid produced by mixing water and carbon dioxide exhibits weak acidity. Therefore, an effect of cleaning and removing inorganic substances such as metals exhibiting alkalinity besides water-soluble contaminants is achieved. If water remains in the pipe for supplying various liquids to the processing space SP, it possibly causes corrosion. Thus, in general, it is not necessarily preferable to connect a pipe for supplying water to the processing chamber 412. However, since the cleaning liquid is carried into the processing space SP without via any pipe while being stored in the container 70 in this embodiment, a composition of the cleaning liquid can be selected without considering a problem of corrosion.

To enhance the cleaning effect, additives such as a surfactant may be added to the cleaning liquid. Further, for the same purpose, the cleaning liquid may be heated to an appropriate liquid temperature. The cleaning liquid needs not necessarily be poured into the cleaning liquid container 70 in the wet processing apparatus 2. However, if the wet processing apparatus 2 provided with a function of supplying various processing liquids to process the substrate S is used, the composition and temperature of the cleaning liquid Lc stored in the container 70 can be precisely adjusted. Therefore, a good and stable cleaning effect can be obtained.

The cleaning processing is preferably regularly performed at predetermined intervals while a plurality of substrates S are successively processed. For example, the cleaning processing can be performed every time the number of the processed substrates S reaches a specified value. Further, when the type of substrates S to be processed is changed, the cleaning processing may be performed prior to that.

Note that the substrate processing system 1 of the above embodiment is provided with one wet processing apparatus 2 and one supercritical processing apparatus 4. However, some of other substrate processing systems are provided with a plurality of wet processing apparatuses and a plurality of supercritical processing apparatuses. The invention can be applied also to such substrate processing systems.

<Modification>

Figure 15:
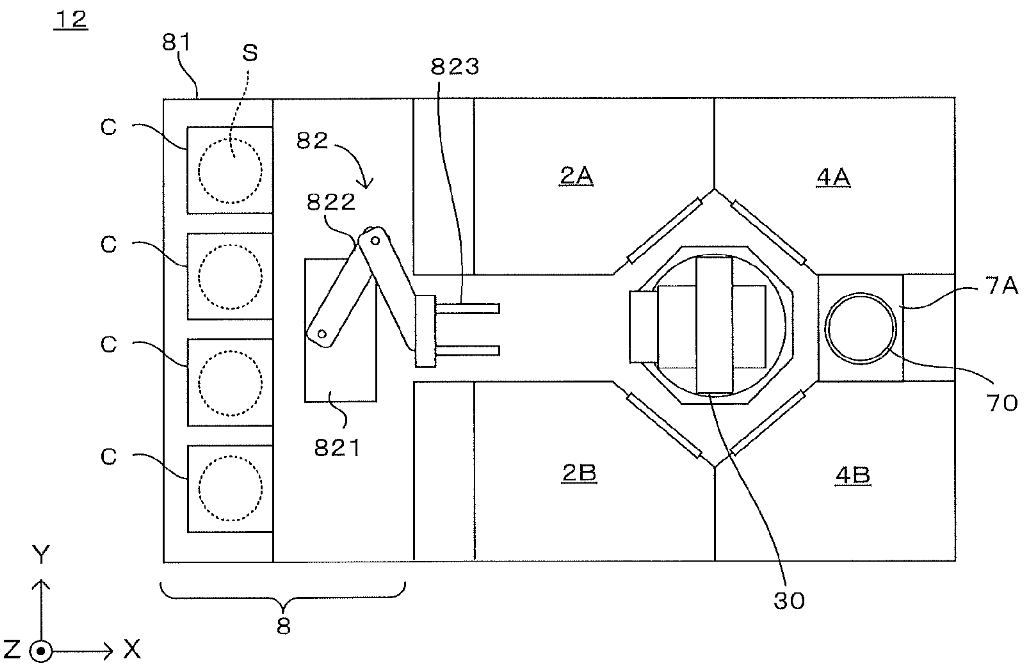
FIG. 15 is a diagram showing another configuration example of a substrate processing system.

FIG. 15 is a diagram showing another configuration example of a substrate processing system, to which the invention is applicable. This substrate processing system 12 is provided with two wet processing apparatuses 2A, 2B and two supercritical processing apparatuses 4A, 4B. Note that these may be multi-stacked in Z direction.

Both of the two wet processing apparatuses 2A, 2B have a configuration similar to that of the wet processing apparatus 2 described above. Further, both of the two supercritical processing apparatuses 4A, 4B have a configuration similar to that of the supercritical processing apparatus 4 described above. A center robot 30 is provided in a space surrounded by these. The configurations and functions of these are not described since being similar to those in the above embodiments.

An indexer 8 is provided on a (−X) direction side of these processing apparatuses. The indexer 8 is provided with a container holder 81 and an indexer robot 82. The container holder 81 is capable of holding a plurality of storage containers C (FOUPs (Front Opening Unified Pods), SMIF (Standard Mechanical Interface) pods, OCs (Open Cassettes) or the like for accommodating a plurality of substrates in a sealed state) for accommodating substrates S. The indexer robot 82 takes out an unprocessed substrate S from the storage container C and stores the processed substrate into the storage container C by accessing the storage container C held in the container holder 81. A plurality of substrates S are accommodated substantially in a horizontal posture in each storage container C.

The indexer robot 82 includes a base 821 fixed to an apparatus housing, an articulated arm 822 provided rotatably about a vertical axis with respect to the base 821 and a hand 823 attached to the tip of articulated arm 822. The hand 823 is structured such that the substrate S can be placed and held on the upper surface thereof. Since an indexer robot including an articulated arm and a hand for holding a substrate as just described is known, detailed description is omitted.

In this substrate processing system 12, the unprocessed substrate S accommodated in the storage container C is taken out by the indexer robot 82, and the indexer robot 82 transfers the substrate S to the center robot 30. The substrate S is processed as described above. However, an access destination of the center robot 30 changes according to need since the plurality of wet processing apparatuses and the plurality of supercritical processing apparatuses are provided.

The processed substrate S is transferred from the center robot 30 to the indexer robot 82, and the indexer robot 82 accommodates the substrate S into the storage container C. In this way, the substrates S held in the storage containers C are successively processed.

A container stocker 7A is provided on a (+X) side of the center robot 30, and a cleaning liquid container 70 is stored in this container stocker 7A. When a cleaning processing is performed if necessary, the center robot 30 takes out the cleaning liquid container 70 from the container stocker 7A and successively conveys the cleaning liquid container 70 to the wet processing apparatus 2A or the like and the supercritical processing apparatus 4A or the like in a manner similar to the above. Only one cleaning liquid container 70 may be provided or a plurality of cleaning liquid containers 70 may be provided. For example, as many cleaning liquid containers 70 as the wet processing apparatuses and the supercritical processing apparatuses may be prepared. Further, when these apparatuses are multi-stacked, as many cleaning liquid containers 70 as stacking levels may be prepared.

<Miscellaneous>

As described above, in the above embodiments, the substrate processing system 1 provided with the wet processing apparatus 2, the conveyor device 3 (center robot 30), the supercritical processing apparatus 4, the container stocker 7 and the controller 9. Further, the substrate processing system 12 provided with the wet processing apparatuses 2A, 2B, the center robot 30, the supercritical processing apparatuses 4A, 4B, the container stocker 7A and the controller 9 respectively correspond to a "substrate processing system" of the invention. Further, the cleaning liquid container 70 function as a "container" of the invention and the container stocker 7, 7A function as a "stocker" of the invention. Further, the support tray 415 functions as a "supporting member" of the invention.

Note that the invention is not limited to the embodiments described above and various changes other than the aforementioned ones can be made without departing from the gist of the invention. For example, the cleaning attachments 61 to 65 of the above respective embodiments include the cleaner specialized for the purpose of cleaning a specific part of the processing space SP, and those are selectively attachable to the support tray 415.

However, a plurality of cleaners having different applications may be provided for one cleaning attachment by combining the above respective embodiments. Further, for the same reasons, cleaning may be performed by successively replacing a plurality of types of cleaning attachments at the time of maintenance.

Further, each member constituting the cleaning attachment is made of resin or made of metal covered with resin in the above respective embodiments. However, metal parts may be exposed for members, which do not contact the processing chamber 412 and the support tray 415, in a series of processes including attachment, cleaning and removal.

Further, the processing chambers 412 of the above supercritical drying apparatus 4 includes the slit-like opening having the longitudinal direction oriented in the horizontal direction in the side surface thereof. However, the structure and the opening shape of the chamber to be cleaned by the cleaning attachment of the invention are not limited to these and various structures and shapes are applicable.

Further, for example, in the cleaning processings of the above embodiments, the supercritical cleaning processing using one type of cleaning liquid is performed once. However, if necessary, a plurality of supercritical cleaning processings may be performed using the same type of cleaning liquid or a plurality of supercritical cleaning processings may be performed using different types of cleaning liquids. Further, an appropriate pre-processing or post-processing may be added before or after the supercritical cleaning processing.

Further, the processing chamber 412 of the above supercritical processing apparatus 4 includes the slit-like opening having the longitudinal direction oriented in the horizontal direction in the side surface thereof. However, the cleaning processing according to the invention is applicable to various processing chambers without being limited to the structure and the opening shape of such a processing chamber. For example, the cleaning method of the invention can be applied also to a processing chamber including a relatively large opening to enable a manual cleaning operation.

Further, various chemical substances used in the processings of the above embodiments are some examples, and various others can be used if these are consistent with the technical concept of the invention described above.

As the specific embodiments have been illustrated and described above, the cleaning liquid can mainly contain the same type of liquid as the liquid adhering to the substrate when the substrate is accommodated into the processing space in the processing chamber cleaning method according to the invention. A liquid to be dissolved into the processing fluid well is selected as such a liquid. Therefore, the cleaning liquid can spread in the entire processing space and an excellent cleaning effect can be obtained by using the same type of liquid as the cleaning liquid.

Further, for example, water-soluble contaminants can be effectively removed in the case of using the cleaning liquid containing water. Particularly, if the processing fluid is carbon dioxide, an excellent cleaning effect is obtained for alkaline stain since carbonic acid produced by mixing water and carbon dioxide exhibits weak acidity.

Further, for example, the cleaning liquid may be preheated. In this way, the cleaning effect can be further enhanced.

Further, for example, the processing space may be filled with the processing fluid by applying the supply recipe when the processing fluid is supplied to the processing space to process the substrate. By doing so, it is not necessary to prepare a special recipe for the purpose of cleaning the processing chamber. That is, the cleaning of the inside of the processing chamber can be realized by the same process as that of performing the supercritical processing for the substrate.

Further, the substrate processing system according to the invention may be provided with a stocker for temporarily holding the container. In performing the processing for the substrate, the container for storing the cleaning liquid is not necessary.

By providing the stocker for storing this container, the conveyor device needs not hold the container. In this way, it is possible to combine the processing of the substrate and the cleaning of the processing chamber.

Further, in the cleaning attachment according to the invention, the cleaner may include, for example, a wiping member formed of a porous resin material or fabric and configured to come into contact with the wall surface. In this way, the cleaning effect can be enhanced. In this case, the wiping members may be provided to correspond to the ceiling surface and bottom surface or may be provided to correspond to the side wall surfaces, out of the wall surface. Further, the wiping members may be provided to correspond to both of those.

Further, for example, the cleaner may include an arm extending in a direction oblique to an advancing/retreating direction of the supporting member and a wiping member formed of a porous resin material or fabric and provided on the tip of the arm in the advancing/retreating direction. According to such a configuration, the arm is elastically deformed according to an advancing/retreating movement of the supporting member, whereby an action to rub the wall surface is promoted and the cleaning effect can be improved.

Further, for example, the engager may include a coupling member for coupling the connector and substrate supporting member. In this case, at least one of the connector and the coupling member is preferably formed of a resin material or structured to cover the surface of a metal member with a resin material. According to such a configuration, it can be prevented that fine powder is produced due to the rubbing of metals to contaminate the processing space when the cleaning attachment is attached to or removed from the supporting member.

Further, for example, the cleaner may be provided with at least one of a suction nozzle for sucking the gas in the processing space and a discharge nozzle for discharging the fluid to the processing space. According to such a configuration, contaminants separated from the wall surface by the contact of the cleaner can be effectively removed.

This invention can be applied to substrate processing techniques in general for processing a substrate in a supercritical processing chamber. Particularly, this invention can be suitably applied for the purpose of cleaning the inside of the supercritical processing chamber for performing a substrate drying processing for drying a substrate such as a semiconductor substrate by a supercritical fluid.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. The processing chamber cleaning method for a supercritical processing system which includes:

a wet processing apparatus for processing a substrate by supplying a processing liquid to the substrate; and a supercritical processing apparatus having a processing chamber for accommodating a supporting member supporting the substrate into a processing space of the processing chamber and processing the substrate by a processing fluid in a supercritical state in the processing space;

the processing chamber cleaning method comprising:

transporting a container from a container stocker storing the container to the wet processing apparatus, the container having a flat bottom surface and a side wall surface extending upward from an outer peripheral part of the flat bottom surface;

storing a cleaning liquid in the container by the wet processing apparatus;

conveying the container with the cleaning liquid from the wet processing apparatus into the processing chamber of the supercritical processing apparatus and supporting the container by the supporting member; and accommodating the supporting member into the processing space, filling the processing space within which the container and the cleaning liquid therein are present, with the processing fluid in the supercritical state so that at least part of the cleaning liquid is dissolved into the processing fluid and then discharging the processing fluid by the supercritical processing apparatus, thereby cleaning the processing chamber of the supercritical processing apparatus.

2. The processing chamber cleaning method according to claim 1, wherein the cleaning liquid contains a same type of liquid as liquid adhering to the substrate when the substrate is accommodated into the processing space.

3. The processing chamber cleaning method according to claim 1, wherein the cleaning liquid contains water.

4. The processing chamber cleaning method according to claim 1, wherein the cleaning liquid is preheated.

* * * * *